(12) United States Patent
Vo et al.

(10) Patent No.: US 11,599,245 B2
(45) Date of Patent: Mar. 7, 2023

(54) OPTICAL FIBER WEB APPLICATION

(71) Applicant: viaPhoton, Inc., Aurora, IL (US)

(72) Inventors: Hong Ha Vo, Boliqueime (PT); Maksym Novikov, Kiev (UA); Syed Babar Abbas, Chicago, IL (US)

(73) Assignee: viaPhoton, Inc., Aurora, IL (US)

( * ) Notice: Subject to any disclaimer, the term of this patent is extended or adjusted under 35 U.S.C. 154(b) by 0 days.

(21) Appl. No.: 17/478,726

(22) Filed: Sep. 17, 2021

(65) Prior Publication Data

US 2022/0091703 A1     Mar. 24, 2022

Related U.S. Application Data

(60) Provisional application No. 63/080,383, filed on Sep. 18, 2020.

(51) Int. Cl.
    *G06F 3/0482*      (2013.01)
    *H04L 41/0806*      (2022.01)

(52) U.S. Cl.
    CPC ........ *G06F 3/0482* (2013.01); *H04L 41/0806* (2013.01); *G06F 2203/04803* (2013.01)

(58) Field of Classification Search
    CPC ...................... G06F 3/048–05; H04L 41/0806
    See application file for complete search history.

(56) References Cited

U.S. PATENT DOCUMENTS

| | | | | |
|---|---|---|---|---|
| 6,772,204 B1* | 8/2004 | Hansen | ................... | H04L 41/22 709/224 |
| 7,149,975 B1* | 12/2006 | Johnson | ................... | H04L 41/22 709/224 |
| 2005/0143077 A1* | 6/2005 | Charbonneau | ........ | H04W 16/20 455/446 |
| 2008/0201112 A1* | 8/2008 | Bouchard | ............... | G06F 30/00 703/1 |
| 2008/0267090 A1* | 10/2008 | Okita | ...................... | H04L 12/66 370/254 |
| 2011/0029880 A1* | 2/2011 | Neuse | ................... | H04L 41/147 715/735 |
| 2011/0307820 A1* | 12/2011 | Rasmussen | ............. | G06F 30/13 715/771 |
| 2012/0096363 A1* | 4/2012 | Barnes | ............... | H04N 21/4363 705/14.59 |

(Continued)

*Primary Examiner* — Daniel Rodriguez
(74) *Attorney, Agent, or Firm* — Ferguson Braswell Fraser Kubasta, PC

(57) ABSTRACT

A method implements a web application that designs components. The method includes configuring a network interactively by receiving a network selection, updating network selection options using the network selection, and presenting network view updated using the network selection. The method includes generating a component listing for at least a part of the network of the network and using the network selection. The method includes configuring a component from the component listing interactively by receiving a component selection, updating component selection options using the component selection, and presenting a component view updated using the component selection. The method includes presenting a schedule, for the component listing, generated by simulating assembly of components, including the component, of the component listing using a planning system.

20 Claims, 31 Drawing Sheets

(56) References Cited

U.S. PATENT DOCUMENTS

| | | | |
|---|---|---|---|
| 2012/0158370 A1* | 6/2012 | Logatoc | G06F 30/15 |
| | | | 703/1 |
| 2016/0112276 A1* | 4/2016 | Nagarajan | H04L 67/10 |
| | | | 715/736 |
| 2016/0301575 A1* | 10/2016 | Jau | H04L 41/12 |
| 2019/0199597 A1* | 6/2019 | Valisammagari | H04L 41/40 |
| 2019/0377591 A1* | 12/2019 | Dimitrov | H04L 63/20 |

* cited by examiner

OPTICAL FIBER WEB APPLICATION

CROSS REFERENCE TO RELATED APPLICATIONS

This application claims the benefit of U.S. Provisional Application 63/080,383, filed Sep. 18, 2020, which is incorporated by reference herein.

BACKGROUND

Data centers use optical cables to connect networking equipment, including switches, routers, and servers. Different cables may use different lengths and connectors to connect the networking equipment. A challenge is to identify and enumerate the different components and configurations (cables, lengths, connectors, panels, modules, components, etc.) to assemble and connect the networking equipment.

SUMMARY

In general, in one or more aspects, the disclosure relates to a method that implements a web application that designs components. The method includes configuring a network interactively by receiving a network selection, updating network selection options using the network selection, and presenting network view updated using the network selection. The method includes generating a component listing for at least a part of the network of the network and using the network selection. The method includes configuring a component from the component listing interactively by receiving a component selection, updating component selection options using the component selection, and presenting a component view updated using the component selection. The method includes presenting a schedule, for the component listing, generated by simulating assembly of components, including the component, of the component listing using a planning system.

In general, in one or more aspects, the disclosure relates to a system that includes a network configuration controller, a component configuration controller, a schedule controller, and an application that executes on at least one processor of the system. The application is configured for configuring, with the network configuration controller, a network interactively by receiving a network selection, updating network selection options using the network selection, and presenting network view updated using the network selection. The application is configured for generating a component listing for at least a part of the network of the network and using the network selection. The application is configured for configuring, with the component configuration controller, a component from the component listing interactively by receiving a component selection, updating component selection options using the component selection, and presenting a component view updated using the component selection. The application is configured for presenting a schedule, for the component listing, generated by the schedule controller by simulating assembly of components, including the component, of the component listing using a planning system.

In general, in one or more aspects, the disclosure relates to a set of one or more non-transitory computer readable mediums that include computer readable program code that executes on a computing system. The computer readable program code configured for configuring a network interactively by receiving a network selection, updating network selection options using the network selection, and presenting network view updated using the network selection. The computer readable program code configured for generating a component listing for at least a part of the network of the network and using the network selection. The computer readable program code configured for configuring a component from the component listing interactively by receiving a component selection, updating component selection options using the component selection, and presenting a component view updated using the component selection. The computer readable program code configured for presenting a schedule, for the component listing, generated by simulating assembly of components, including the component, of the component listing using a planning system.

Other aspects of the invention will be apparent from the following description and the appended claims.

BRIEF DESCRIPTION OF DRAWINGS

FIG. 3, FIG. 4, FIG. 5, FIG. 6A, FIG. 6B, FIG. 6C, FIG. 7, FIG. 8, FIG. 9, FIG. 10, FIG. 11, FIG. 12, FIG. 13A, FIG. 13B, FIG. 14, FIG. 15A, FIG. 15B, FIG. 16, FIG. 17, FIG. 18, FIG. 19, FIG. 20, FIG. 21, FIG. 22, FIG. 23, FIG. 24, FIG. 25, and FIG. 26 show examples in accordance with disclosed embodiments.

DETAILED DESCRIPTION

Figure 1:
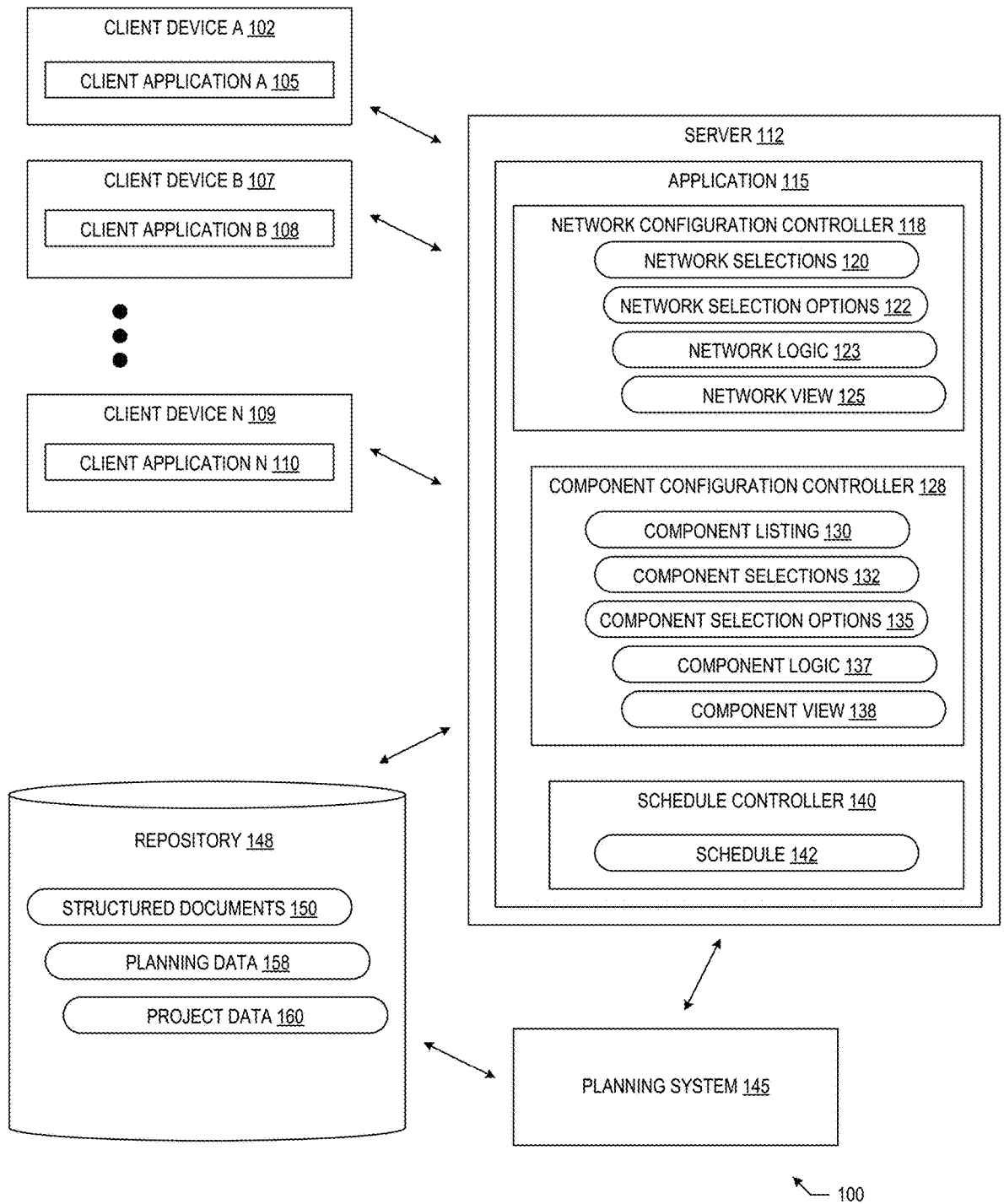
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure use a web application to identify and enumerate the different components for connecting the networking equipment of a data center, including cables, connectors, panels, modules, etc. The web application is operated by a user to interactively design a network using optical cables by continuously updating the available options and views of the network as the user designs the network. With the web application, users may design data center network connectivity projects, configure connectivity options and preferences, automatically generate and then configure component listings (also referred to as bills of materials (BOMs)) for the components of the network, and manage the design of the components (cables, lengths, connectors, panels, modules, etc.) for the network of the data center. The generation and configuration of the component listings can be reduced from days or weeks to a few hours. Additionally, the application reduces errors by using logic to identify incompatible selections of the components.

FIG. 1 shows a diagram of the system (100) that implements an optical fiber web application. Embodiments of FIG. 1 may be combined and may include or be included within the features and embodiments described in the other figures of the application. The features and elements of FIG. 1 are, individually and as a combination, improvements to cable assembly technology and computing systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) implements a web application to design networks that use fiber optic cables and which may also use electric cables. Users interact with the server (112) to select options used to automatically generate the components for building the network, configure the components, and generate the schedule (142). In one embodiment, the system (100) hosts a website, and the options are selected with human input devices (mouses, keyboards, etc.). The system (100) includes the client devices A (102) through N (109), the server (112), the planning system (145), and the repository (148).

Figure 27A:
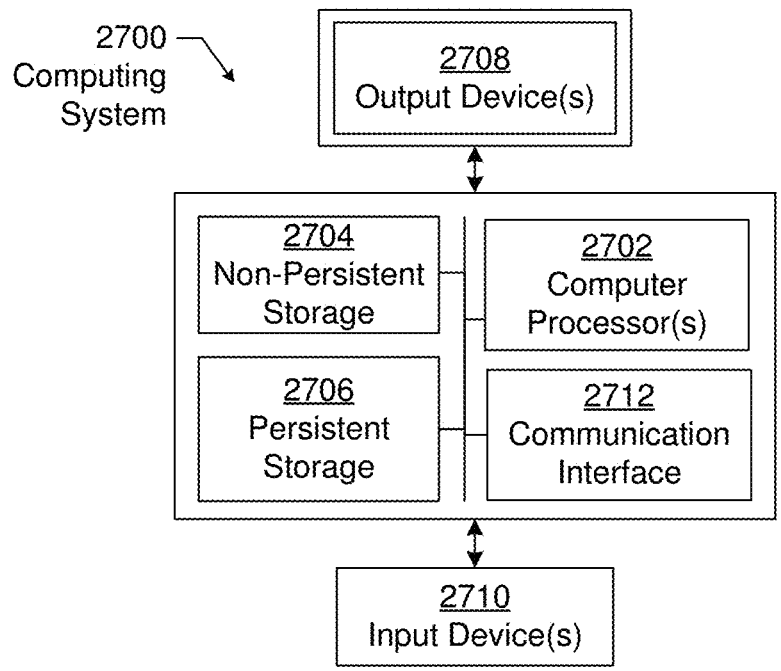
FIG. 27A and FIG. 27B show computing systems in accordance with disclosed embodiments.

The client devices A (102) and B (107) through N (109) are computing systems (further described in FIG. 27A). For example, the client devices A (102) and B (107) through N (109) may be desktop computers, mobile devices, laptop computers, tablet computers, etc. The client devices A (102) and B (107) through N (109) include hardware components and software components that operate as part of the system (100). The client devices A (102) and B (107) through N (109) communicate with the server (112) to display and manipulate the data stored in the repository (148). The client devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), JavaScript Object Notation (JSON), etc. The client devices A (102) and B (107) through N (109) respectively include the client applications A (105) and B (108) through N (110).

The client applications A (105) and B (108) through N (110) may each include multiple programs respectively running on the client devices A (102) and B (107) through N (109). The client applications A (105) and B (108) through N (110) may be native applications, web applications, embedded applications, etc. In one embodiment the client applications A (105) and B (108) through N (110) include web browser programs that display web pages from the server (112) and execute web applications.

In one embodiment, the client device A (102) may be used by a network designer to design a network that uses optical cables, identify and configure the components used in the network, and generate the schedule (142) for the components of the network. The networks designed by the user are stored as projects in the project data (160). The user of the client device A (102) may load the application (115) that is hosted by the server (112). The application (115) displays questions and options for designing the network. The user provides responses that answer the questions, selects options, and generates the schedule (142).

In one embodiment, the client device B (107) may be used by a different network designer to design a network. Each user may have an individual account with multiple projects stored in the project data (160).

The client device N (109) may be used by a developer to control the hardware and software components of the system (100). A developer using the client device N (109) may generate the structured documents (150) that form the basis of the application (115).

The server (112) is a computing system (further described in FIG. 27A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the application (115).

The application (115) is a collection of programs that may execute on multiple servers of a cloud environment, including the server (112) and on the client devices A (102) through N (109). The application (115) is hosted by the server (112), which may distribute the application (115) to the client devices A (102) through N (109). In one embodiment, the application (115) is a web application that may execute on the client devices A (102) through N (109) through the client applications A (105) through N (110). The application (115) includes the network configuration controller (118), the component configuration controller (128), and the schedule controller (140).

The network configuration controller (118) controls the design of a network for a project of a user. The network configuration controller (118) receives the network selections (120), updates and displays the network selection options (122), applies the network logic (123), and displays the network view (125).

The network selections (120) are the selections made by a user of the system (e.g., with the client device A (102)). The network selections (120) may identify the type of network, the number of components, the types of components, etc., that make up the network being designed.

The network selection options (122) are the options available for a network being designed. The network selection options (122) may include options grouped into network rows and server rows. The network rows include network level options. The server rows include server level options. The network selection options (122) that are available are continuously updated based on the network selections (120) and the network logic (123). Certain options may be identified as incompatible with the network selections (120). If an incompatible network selection option is selected, the system (100) may identify a set of the network selections (120) to update to resolve the incompatibility.

The network logic (123) is a set of rules that identify compatible network selections. The network logic (123) is applied to the network selection options (122) after a network selection is received. The network logic (123) identifies the network selection options (122) that are compatible (or incompatible) with the present set of network selections (120). The network logic (123) may be persisted in the repository (148) and retrieved on demand (or periodically) with a script. In one embodiment, the network logic (123) includes network components logic and network visualization logic. The network components logic includes rules on the compatibility of components. The network visualization logic includes rules for drawing components with proper positioning onto user interfaces of the client applications A (105) through N (110) of the client devices A (102) through N (109).

The network view (125) displays an image of components of the network being designed. In one embodiment, the image of the network view (125) is composed of other rendered images of components. The network view (125) may be updated as each of the network selections (120) are received to display changes to the components of the network affected by the network selections (120).

The component configuration controller (128) controls configuration of the components of a network being built by a user. The component configuration controller (128) generates the component listing (130) from the network selections (120), receives the component selections (132), updates and displays the component selection options (135), applies the component logic (137), and displays the component view (138).

The component listing (130) (also referred to as a bill of materials) identifies the components that may be used to construct the network designed by a user. The component listing (130) may be generated automatically from the network selections (120) and then configured by the user. For example, the component listing (130) may identify a number of optical cables for connecting the equipment of the network and a user may adjust the types of connector, lengths of cables, etc. The component listing (130) is continuously updated to include the component selections (132).

The component selections (132) are the selections made by a user of the system (e.g., with the client device A (102)). The component selections (132) may configure the components for the network being designed.

The component selection options (135) are the options available for components for a network being designed. The component selection options (135) that are available are continuously updated based on the network selections (120), component selections (132), the network logic (123), and the component logic (137). Certain options may be identified as incompatible with the component selections (132) or the network selections (120). If an incompatible component selection option is selected, the system (100) may identify a set of the component selections (132) and the network selections (120) to update to resolve the incompatibility.

The component logic (137) is a set of rules that identify compatible component selections. The component logic (137) is applied to the component selection options (135) after a component selection is received. The component logic (137) identifies the network selection options (122) that are compatible (or incompatible) with the present set of component selection options (135) and network selections (120). The component logic (137) may be persisted in the repository (148) and retrieved on demand (or periodically) with a script. In one embodiment, the component logic (137) includes component compatibility logic and component visualization logic. The component compatibility logic includes rules on the compatibility of components and respective subcomponents and parts for a component. The component visualization logic includes rules for drawing components with parts and subcomponents with proper positioning onto user interfaces of the client applications A (105) through N (110) of the client devices A (102) through N (109).

The component view (138) displays an image of a component of the network being designed. In one embodiment, the image of the component view (138) is built from layering and positioning images of parts of a component. The component view (138) may be updated as each of the component selections (132) are received to display changes to the component affected by the component selections (132).

The schedule controller (140) controls the generation of the schedule (142) for a network for a project of a user. The schedule controller (140) receives the component listing (130) (updated with the component selections (132)) and generates the schedule (142) using the planning system (145).

The schedule (142) identifies the lead times for building the components identified in the component listing (130). The lead times may be extracted from the planning data (158) with the planning system (145) and provided as part of a report.

The planning system (145) (also referred to as an enterprise resource planning (ERP) system) is a set of hardware and software components that maintains the planning data (158). The planning system (145) may be accessed to extract lead times for components identified in the component listing (130). To extract the lead times, the planning system (145) may run a simulation that simulates the building of the components to determine the lead times for the components.

The repository (148) is a computing system that may include multiple computing devices in accordance with the computing system (2700) and the nodes (2722) and (2724) described below in FIGS. 27A and 27B. The repository (148) may be hosted by a cloud services provider that also hosts the server (112). The cloud services provider may provide hosting, virtualization, and data storage services as well as other cloud services and to operate and control the data, programs, and applications that store and retrieve data from the repository (148). The data in the repository (148) includes the structured documents (150), the planning data (158), the project data (160), etc.

The structured documents (150) are electronic files that store the data used by the system and includes the files and code that form the application (115). The structured documents (150) use a structured document language, which may be a markup language e.g., XML (extensible markup language), HTML (hypertext markup language), JavaScript, JSON (JavaScript object model), etc.

The planning data (158) includes the availability and lead times for the parts used to construct the components identified in the component listing (130). The planning data (158) is accessed by the planning system (145) to generate lead times for the schedule (142).

The project data (160) includes data for projects of the users of the system (100). A project may include a network designed by a user. Each user may generate multiple projects.

Figure 2:
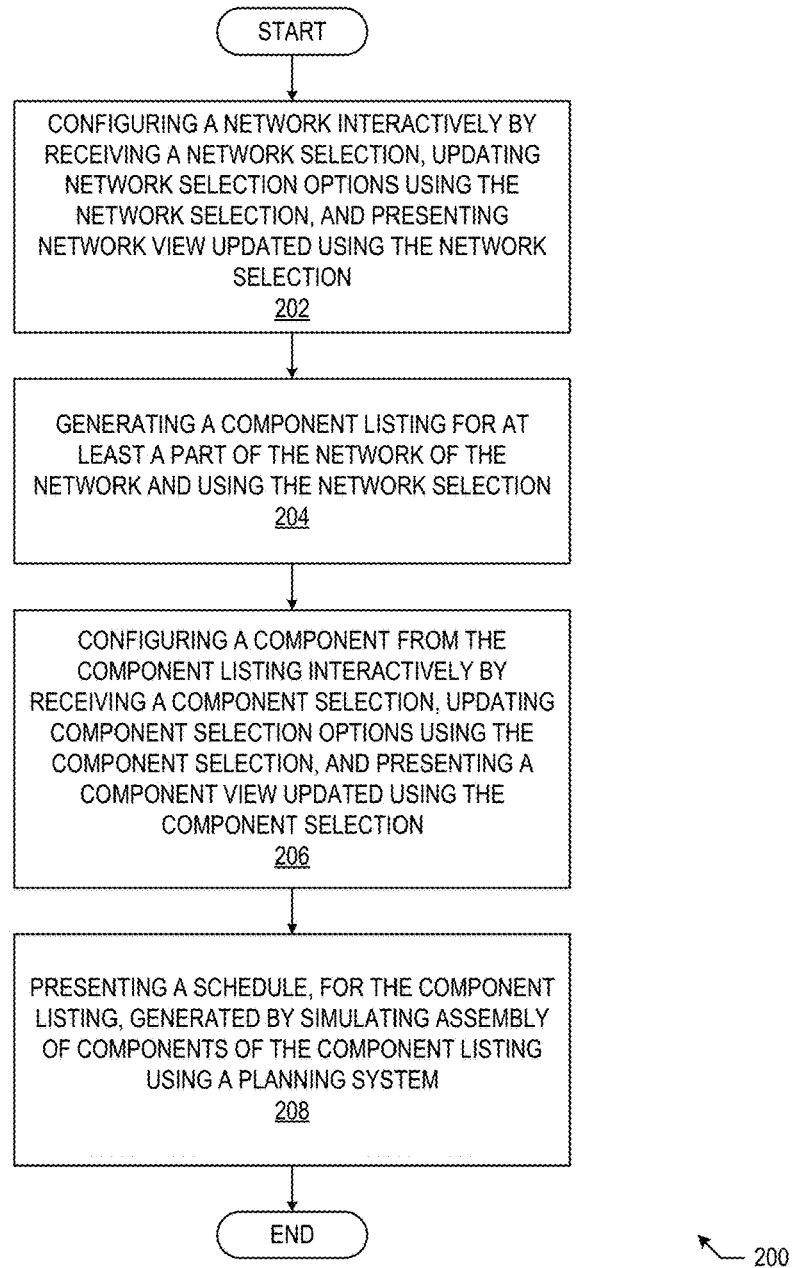
FIG. 2 shows a flowchart in accordance with disclosed embodiments.

FIG. 2 shows a flowchart of a process in accordance with the disclosure. FIG. 2 illustrates the process (200) that configures components. Embodiments of FIG. 2 may be combined and may include or be included within the features and embodiments described in the other figures of the application. The features of FIG. 2 are, individually and as an ordered combination, improvements to cable assembly technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2, the process (200) designs and configure networks and components. The process (200) may execute as part of a web application.

At (202), a network is configured interactively. The network is configured by receiving a network selection, updating network selection options using the network selection, and presenting network view updated using the network selection. In one embodiment, the network view is presented by retrieving a network image that is displayed on a client device. The network image is prerendered and illustrates the network selection. In one embodiment, the client device receives prerendered images of parts of a network (or component) and the client device assembles the prerendered parts images to form the network image using network visualization logic. In one embodiment, the network selection options are updated using network option logic to prevent erroneous selections. In one embodiment, the network selection options are presented in a first window (a window may also referred to as a panel of a user interface of an application) of a user interface and the network selection is received from the first window.

At (204), a component listing is generated for at least a part of the network and using the network selection. Additionally, quality options and corresponding quality selections may also be presented to and answered by the user. The quality selections impact the component listing, e.g., by identifying a minimum level of quality for the components. The part of the network may include a network row selected by a user or a server row selected by a user. In one embodiment, the schedule is generated by transmitting the component listing to the planning system and receiving the schedule from the planning system. In one embodiment, the schedule is generated as a part of a report for the component listing.

At (206), a component is configured from the component listing. The component may be configured interactively by receiving a component selection, updating component selection options using the component selection, and presenting a component view updated using the component selection. In one embodiment, the component view is presented by retrieving a component image that is displayed on a client device. The component image is prerendered, realistic, and illustrates the component selection. In one embodiment, the component image is constructed on the client device from prerendered subcomponent images using component visualization logic retrieved from the server. In one embodiment, the component selection options are updated using component option logic to prevent erroneous selections.

In one embodiment, the component listing is presented in a second window of a user interface and the component selection options are presented in a third window in response to a selection of an item (an item selection) from the second window. The item selected is a component of the network designed by the user and may include any number cables, panels, modules, etc. The component selection may be received from the third window.

At (208), a schedule for the component listing is generated. The schedule is generated by simulating assembly of components of the component listing using a planning system.

Figure 3:
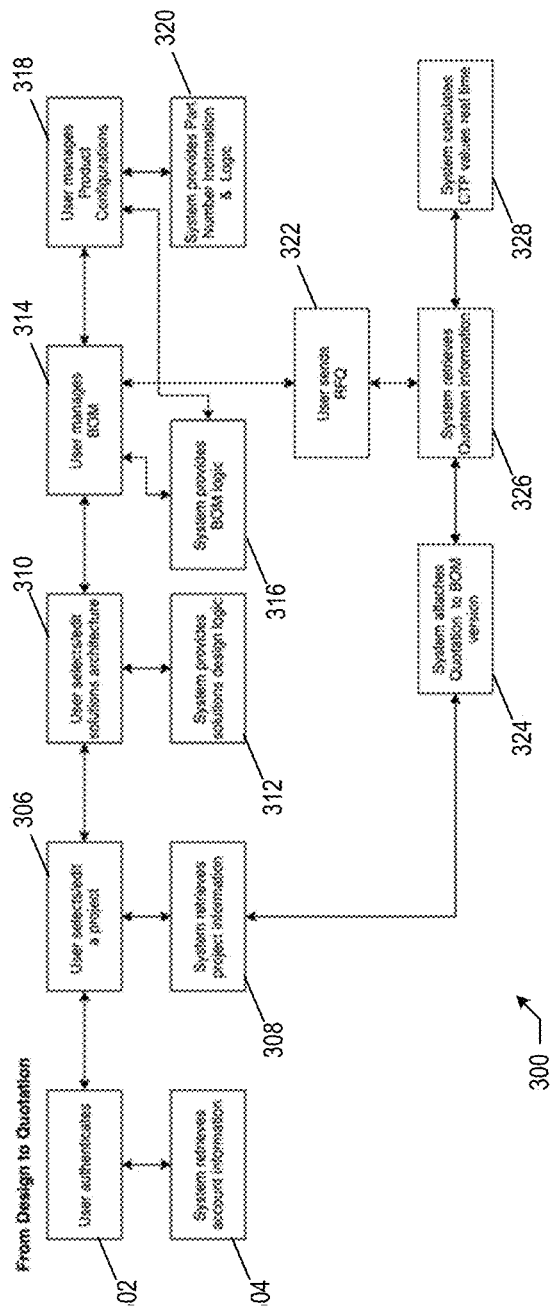
Figure 4:
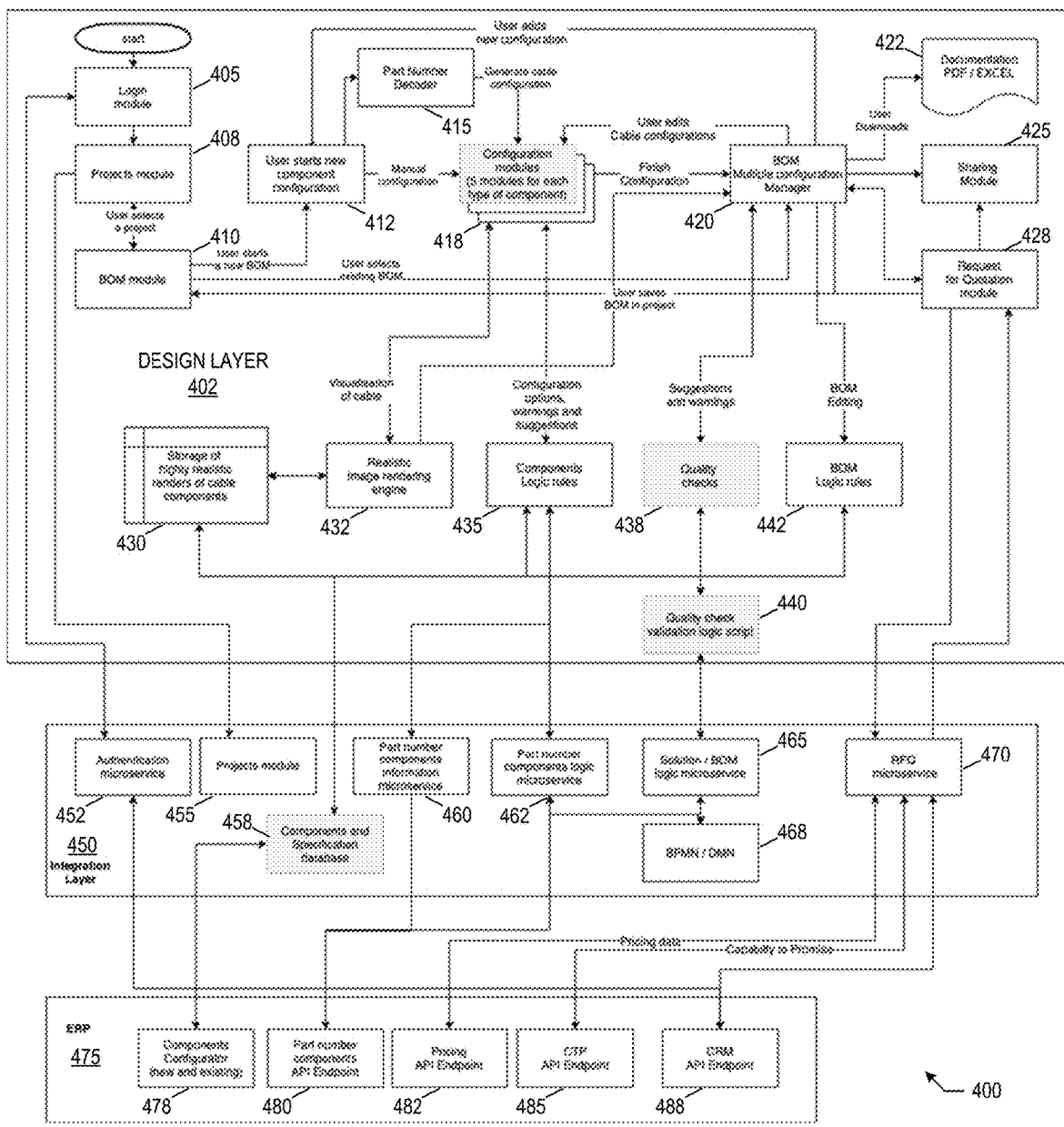

FIGS. 3 through 27 show examples in accordance with the disclosure. FIG. 3 shows an example of a process for designing networks and configuring components. FIG. 4 shows a system that configures components of networks, manages component listings, and generates schedules. FIGS. 5 through 27 show examples of user interfaces. The embodiments shown in FIGS. 3 through 27 may be combined and may include or be included within the features and embodiments described in the other figures of the application. The features and elements of FIGS. 3 through 27 are, individually and as a combination, improvements to cable assembly technology and computing systems. The various features, elements, widgets, components, and interfaces shown in FIGS. 3 through 27 may be omitted, repeated, combined, and/or altered as shown. Accordingly, the scope of the present disclosure should not be considered limited to the specific arrangements shown in FIGS. 3 through 27.

Turning to FIG. 3, the process (300) implements the disclosure to design networks and generate quotations. The process (300) may be performed with the system (100) (of FIG. 1). Different applications used to implement the process (300) may use messages formed and transmitted in accordance with standard protocols (e.g., JSON, HTML, transmission connect protocol (TCP) internet protocol (IP), etc.) to transfer information between the devices executing the applications. The functionality of steps (302), (306), (310), (314), (318), and (322) may be performed by a user with a client device. The functionality of steps (304), (308), (312), (316), (320), (324), (326), and (328) may be performed by one or more servers, which may be hosted in a cloud environment.

At (302), a user authenticates with the system. In one embodiment, the user logs into the website with a username and password.

At (304), the system retrieves account information. The account information includes the projects that have been saved by the user and may include order and delivery status of components identified in the projects of the user. The account information may be retrieved from a repository.

At (306), the user selects and edits projects. The user may select an existing project or initiate a new project.

At (308) the system retrieves project information. The project information may include the network selections, component listings, and component selections for a network designed by a user. The project information may be retrieved from a repository. If a schedule and corresponding quote have been generated, the schedule and quote may also be retrieved.

At (310), the user selects a solutions architecture. The architecture may be a type of network. In one embodiment, the architecture may be individual components (e.g., a panel, modules, and cables), which may be for indoor components or outdoor components. Selection of the solutions architecture may include the network selections for network selection options that are presented in a window on a client device to the user.

At (312), the system provides solutions design logic. The solutions design logic includes the network logic. The solutions design logic updates the options shown on the client device to prevent designing networks and components that are incompatible.

At (314), the user manages a bill of materials. The bill of materials may be generated from a component listing that enumerates the components to be used to build the project designed by the user. The user may add or remove items from the component listing and bill of materials to configure the network.

At (316), the system provides logic for processing the component listing and corresponding bill of material. The component logic (also referred to as bill of material logic) updates the options shown on the client device to prevent designing and configuring components that are incompatible with other selections for the network and components.

At (318), the user manages product configurations. The product configurations may include the component selections for component selection options that are presented in a window of a user interface on a client device to the user. The user may configure the lengths, types of connectors, types of components, etc.

At (320), the system provides part number information, realistic images, and logic. The part number logic may generate part numbers using the component selections for the components that are selected (and may be configured) by the user. Each distinct component is identified by a part number that uniquely identifies the component from a different component that has different options. For example, cables with different lengths and connector types may each have unique part numbers. A part number for a cable may identify the type of cable, length measurements of the cable (total run length, breakout lengths for each end, cable diameters, etc.), types of connectors, etc. In one embodiment, the realistic images correspond to the parts and subcomponents of a component may be linked to the part numbers for the components. In one embodiment, an identifier for a part or subcomponent may be used in a file name for the realistic image of the part or subcomponent and correspond to a substring in the part number for a component.

At (322), a user may send a request for a quote (RFQ). The request may be in a message sent from the client device of the user to a server of the system. The request identifies the components selected by the user for the project designed by the user. In one embodiment, the part numbers of the components are used to identify the components for the request.

At (324), the system attaches a quotation to a version of a bill of materials. For each project, a bill of materials may be saved that includes the component listing that identifies the components of the project. The user may request a quote and then, later, request another quote for the same component listing. The second quote may include different lead times and availability for assembling and delivering the selected components.

At (326), the system retrieves quotation information. The quotation information may include a schedule for the assembly (and delivery) of components from the component listing. The quotation information may include the availability and lead time for the parts used to assemble the components of the component listing.

At (328), the system calculates capable to promise (CTP) values real time. To calculate the values, the system runs a simulation of building the components based on the availability of the components, the lead times for the parts for the components, the build times for the components, etc. The output of the simulation identifies a date by which the components from the component listing may be assembled (and delivered) to the user.

Turning to FIG. 4, the system (400) implements an optical fiber web application. The system (400) includes multiple hardware and software components in the design layer (402), the integration layer (450), and the planning system (475) (labeled as "ERP").

The design layer (402) includes multiple programs that may execute on client devices and servers of the system (400). The design layer provides the interface between the user at a client device and the system (400).

The login module (405) logs a user into the system (400). The user provides authentication information (username, password, token, etc.) using a client device and gains access to the system (400) upon successful authorization.

The projects module (408) manages the projects generated by a user. The project module (408) (in the design layer (402)) interacts with the project module (455) (of the integration layer (450)) to retrieve projects selected by the user.

The BOM module (410) persists the component listings (and bills of materials) for the project loaded by the user. The BOM module (410) may persist the component listings of projects created by a user to a file on a client device. After loading a project, the user may start a new component listing and corresponding bill of materials for the project.

The component configuration (412) may be generated in response starting a new component listing or adding a new configuration to the project. The component configuration (412) stores the component listing for the components of the project selected by the user.

The part number decoder (415) is a module that decodes part numbers. The part numbers may be from the component configuration (412) can converted from part number string values to programming objects that represent the parts and components for the project.

The configuration modules (418) are modules that are used to configure the components for the project. Different configuration modules may be used for different types of networks, components, use cases (e.g., indoor or outdoor), etc. One of the configuration modules (418) may be used to design a network. The configuration modules obtain images from the rendering engine (432) to display views of the project (referred to as network views) to the user.

The configuration manager (420) manages controls the user interaction with the design layer (402). The configuration manager (420) is used to manage the different component listings (and bills of materials) and versions thereof. Through the configuration manager (420), the user may configure and view components of the network of the project loaded from the projects module (408).

The documentation (422) is generated from the component listing generated with the configuration manager (420). The documentation (422) may be persisted to external file formats (printable files, spreadsheets, etc.).

The sharing module (425) is used to share the project, component listings, files, etc., for the project loaded by the user. The user may share the project, component listings, documentation, etc., with other users of the system.

The request module (428) (also referred to as the "request for quotation module") handles requests. The requests are sent to the microservice (470) and request schedules and timing for the assembly (and delivery) of a set of components from a project in the component listing. The schedule received in response to a requestion may include documentation of a request for quote that itemizes the components and lists the timing of the availability of the components.

The renders storage (430) (also referred to as the "storage of highly realistic renders of cable components") persists renders of the components that may be configured and assembled as part of a project. In one embodiment, the renders include renders of parts or subcomponents for various type of components (cables, panels, modules, adapters, etc.) that may be assembled by a client device into an image of a component. In one embodiment, the renders include two dimensional images generated from three dimensional models of the components, parts, and equipment for the networks and projects of a user. The render storage (430) may receive the images from the rendering engine (432).

The rendering engine (432) renders images of the components and equipment for the project of the user. The rendering engine (432) may prerender the images, which are saved to the render storage (430). In one embodiment, the rendering engine (432) may render the images on demand in response to the receipt of selections (e.g., network selections and component selections) from the user for the networks and components of a project. When rendered on demand, the renders storage (430) may act as a cache of the images rendered on demand.

The component logic rules (435) includes the rules used to prevent incompatible selections with the system (400). The component logic rules (435) may include network logic that is applied to network selection options after the receipt of a network selection. The component logic rules (435) may identify compatible components, parts, etc., at a network level. The component logic rules (435) may also be applied to a component listing to identify any incompatibilities in the project with the component listing.

The quality checks (438) form an additional layer of logic used to validate the validity of the components configured and aggregated with the configuration manager (420). The quality checks (438) may run on the client device on top of the BOM logic rules (442). The quality checks (438) may be retrieved from a server with a quality check validation logic script (440). In one embodiment, the quality checks (438) may be defined by the user and include user configured logic rules for the networks and components designed and configured with the system (400).

The validation logic scripts (440) (also referred to as the "quality check validation logic script") are scripts that load additional logic testing the compatibility and erroneousness of the selections for the network and components for a component listing. The validation logic scripts (440) may be configured for each user of the system (400). The validation logic scripts (440) may be a text file that includes code that compiles to rules for checking the components of the component listing. The validation logic scripts (440) may be extensions of other scripts that check the components, which include scripts for the network logic and component logic.

The BOM logic rules (442) includes the rules used to prevent incompatible selections with the system (400). The BOM logic rules (442) may include component logic that is applied to component selection options after the receipt of a network selection. The component logic rules (435) may identify compatible components, parts, etc., at a network level. The BOM logic rules (442) may also be applied to a component listing to identify any incompatibilities in the project with the component listing.

The integration layer (450) includes programs that may operate on servers of a cloud environment. The programs of the integration layer (450) support the programs of the design layer (402) and access the programs and application programming interfaces (APIs) of the planning system (475).

The authentication microservice (452) authenticates users of the system (400). The authentication microservice (452) receives and verifies credentials of a user from the login module (405).

The projects module (455) maintains the projects of users. The projects module (455) may access a database that stores the projects and provide the project data, from the data base, to the projects module (408) (of the design layer).

The database (458) stores the components and specifications for the projects of the users of the system (400). The database (458) may be separate from the database storing the projects of the system (400).

The part number information microservice (460) (referred to as the part number microservice) converts between components and part numbers. Different programs in the system (400) may user the part number information microservice (460).

The part number logic microservice (462) (also referred to as the part number components logic microservice (462)) provides logic that identifies errors with the part numbers for the components of a project. The part number logic microservice (462) applies the part number logic to the component listing to generate warning for the part numbers by calling the part number API endpoint (480).

The solution logic microservice (465) (also referred to as the "solution/BOM logic microservice") applies logic to component listings to identify incompatibilities. The logic may include logic loaded from the solution logic (468) and include logic applied by calling the pricing API endpoint (482).

The solution logic (468) (also referred to as "BPMN/DMN") is logic structured suing business process model notation (BPMN) or decision model notation (DMN). The solution logic (468) may include rules that identify incompatibilities for components in a project based on the selections made to generate the project and configure the components.

The RFQ microservice (470) is a program that generates quotes in response to request from the request module (428). To generate a schedule and corresponding quote, the RFQ microservice (470) calls the pricing API endpoint (482), the CTP API endpoint (485), and the CRM API endpoint (488).

The planning system (475) (also referred to as "ERP") maintains a store of information for assembling components of projects for users. The planning system (475) includes several programs and may be accessed by several application programming interfaces.

The components configurator (478) is a program that maintains the components that may be identified in a component listing and used to build a network designed by a user. The components configurator (478) may store the part number and specifications for the components that are accessed by other programs of the system (400).

The part number components API endpoint (480) provides access to programs of the planning system (475) that store and process part numbers of the components of the projects of users of the system (400). The part number components API endpoint (480) may be accessed to verify the validity part numbers and to generate part numbers from component selections.

The pricing API endpoint (482) provides access to programs of the planning system (475) that store and process pricing information for the components of the projects of users of the system (400). The pricing API endpoint (482) may be accessed to retrieve pricing information for the components of a component listing (and bill of materials).

The CTP API endpoint (485) provides access to programs of the planning system (475) that store and process availability and lead times for the components of the projects of users of the system (400). The CTP API endpoint (485) may be accessed to retrieve availability and lead times to simulate assembly (and delivery) of the components of a component listing (and bill of materials).

The CRM (customer resource management) API endpoint (488) provides access to programs of the planning system (475) that store and process customer information. The customer information may include relationship information. The relationship information may identify communications between the users of the system (400) and the operator of the system (400).

Figure 5:
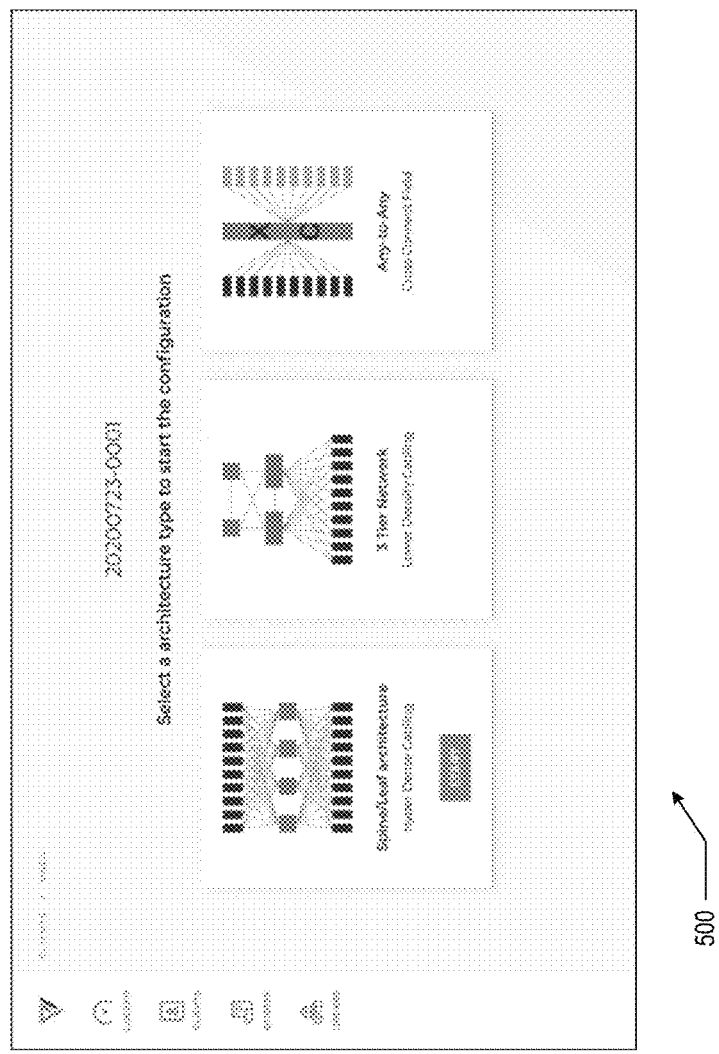

Turning to FIG. 5, the user interface (500) is displayed after a user selects to generate a new project. The user interface (500) displays user interface elements for a network selection for the network selection options "spine/leaf", "3 tier", or "any-to-any" for the type of network to be designed. The list of network types may be extended with more network architecture types. The three different types of networks have different cabling requirements "hyper dense cabling" for "spine/leaf", "lower density cabling" for "3 tier", and "cross connect field" for "any-to-any", which factors into the number of components (e.g., the amount of cabling) for the component list and bill of materials. The user selects "spine/leaf", which is saved by the system.

Figure 6A:
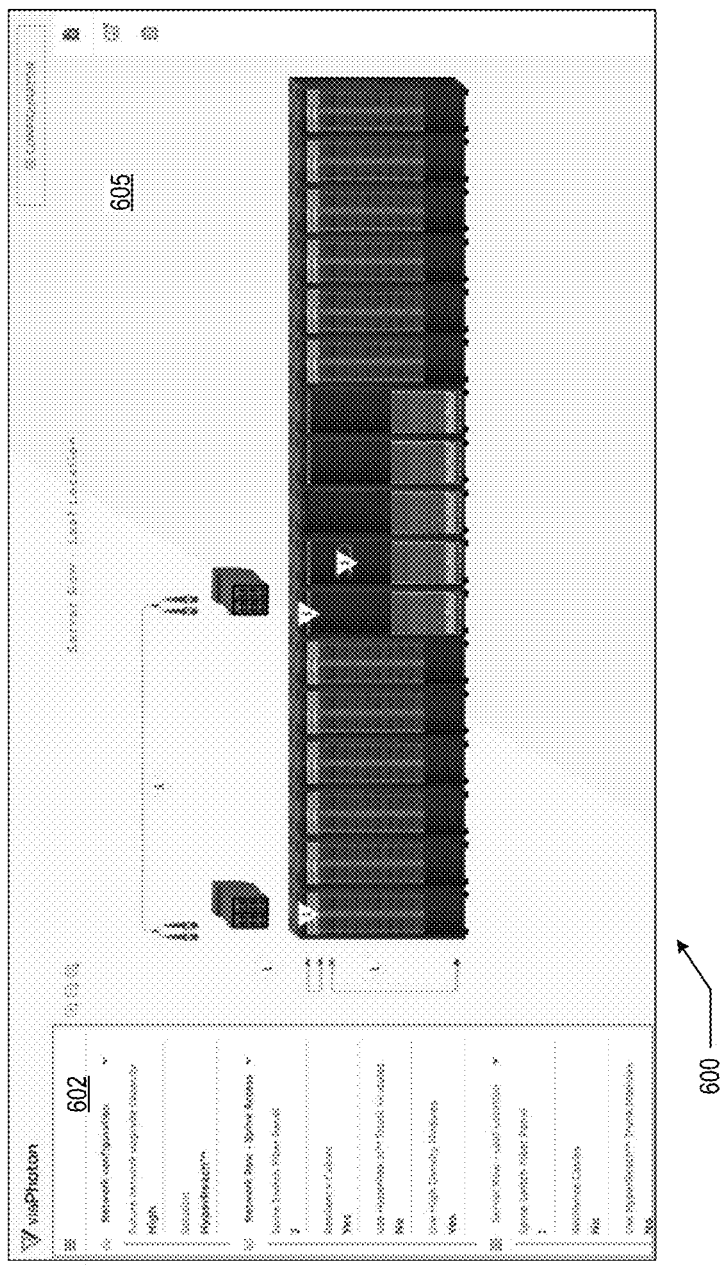

Turning to FIG. 6A, after selection of the "spine/leaf" type of network the user interface (600) is displayed. The user interface (600) includes the window (602) (also referred to as a left window or left panel) and the view (605).

The window (602) displays network selections for network selection options for different sections of a network. Included are sections for "network configuration", "network row—spine access", and "server row—leaf location". Additional sections may be included and different sections may be used for different type of networks (i.e., for "cross connect fiber patch cloud", "distribution layer", etc.).

The view (605) displays an image of the server row, which corresponds to a selected section of the window (602). The image of the view (605) illustrates components of a server row for the network being designed. Display of the components in the view (605) are updated on demand to reflect the selections for the options in the window (602) for the server row.

Figure 6B:
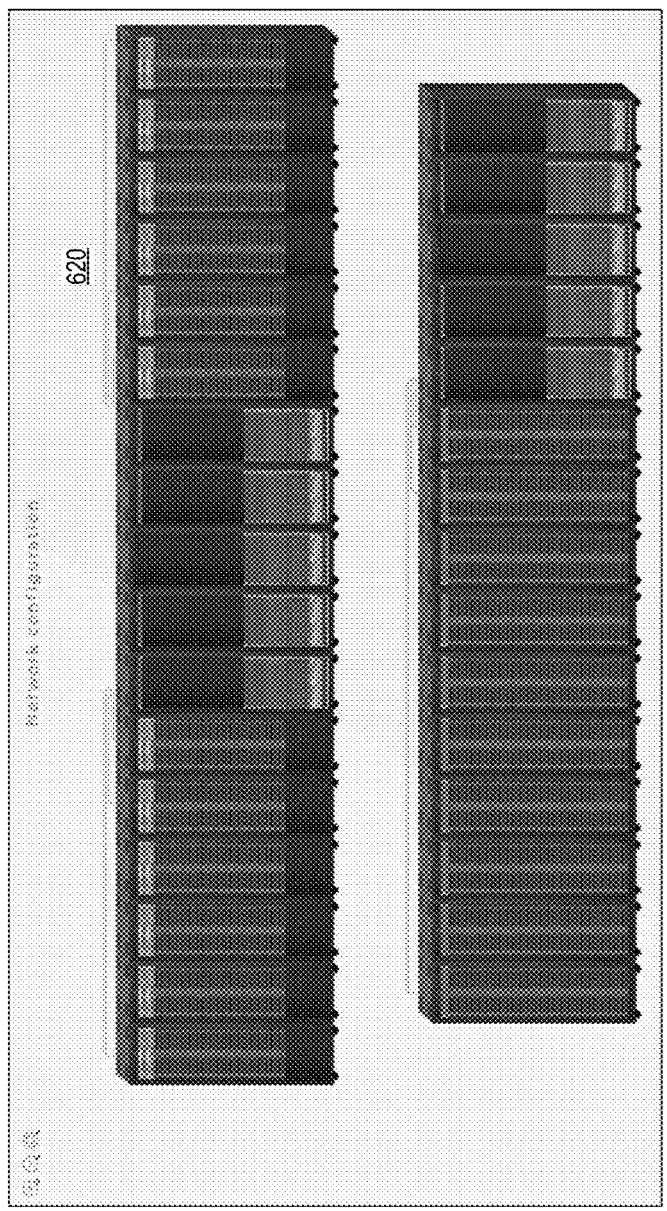

Turning to FIG. 6B, the view (620) displays an image of the network configuration, which corresponds to a selected section of the window (602). The network configuration is a top level selection, showing an overview of how different network areas are connected. The image of the view (620) illustrates components of a network being designed by a user. Display of the components in the view (620) are updated on demand to reflect the selections for the options in the window (602) for the network configuration.

Figure 6C:
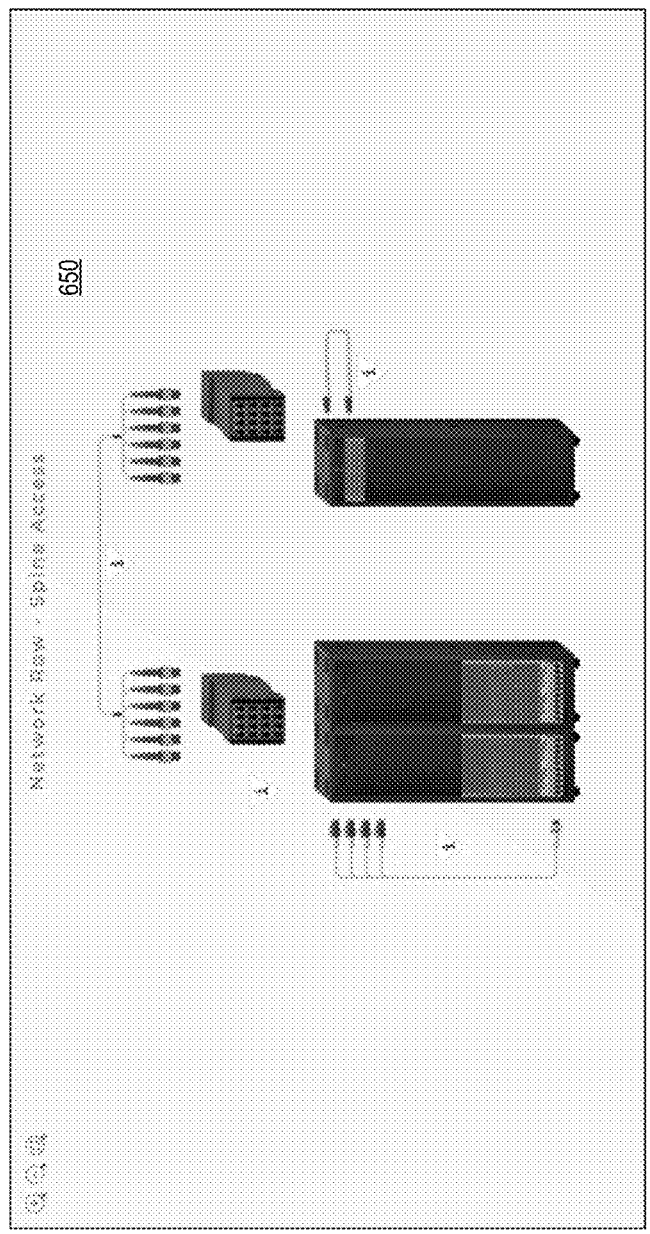

Turning to FIG. 6C, the view (650) displays an image of the network row, which corresponds to a selected section of the window (602). The image of the view (650) illustrates components of a network being designed by a user. Display of the components in the view (650) are updated on demand to reflect the selections for the options in the window (602) for the network row.

Figure 7:
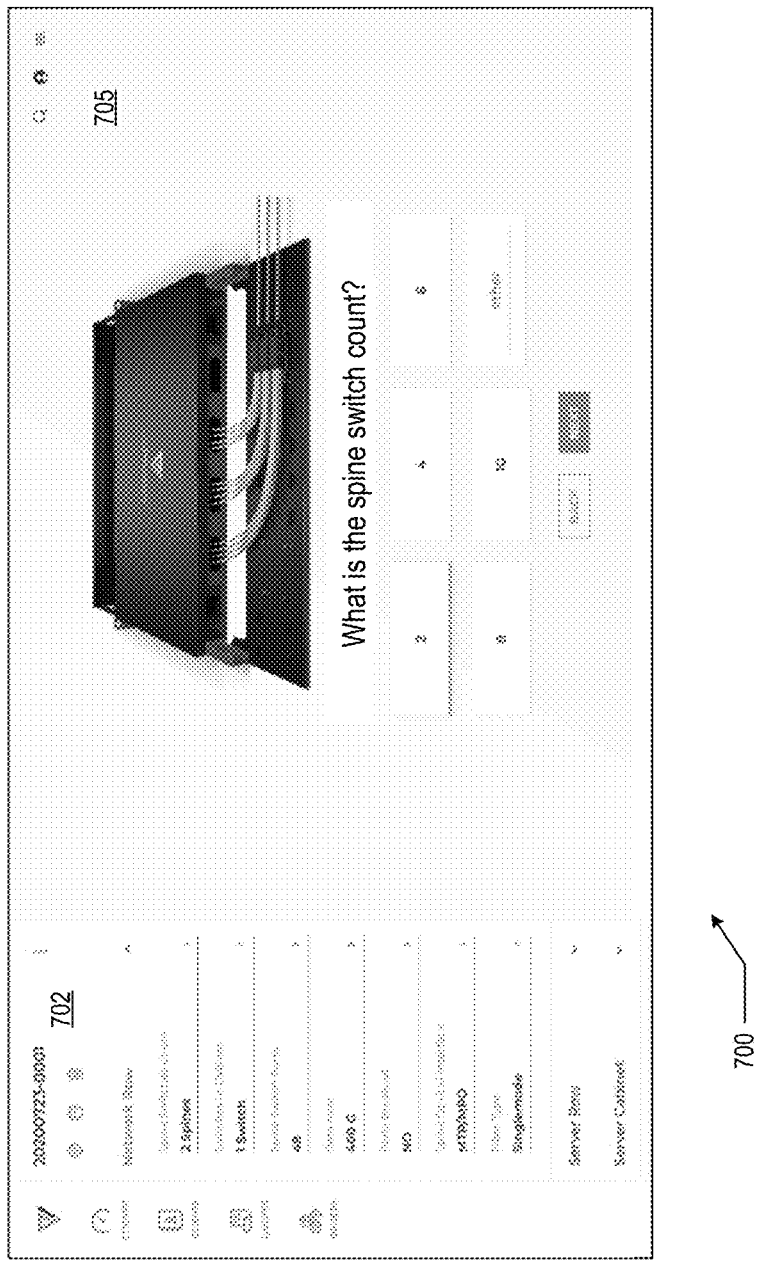

Turning to FIG. 7, the user interface (700) is displayed. The user interface (700) includes the window (702) and the view (705). The window (702) shows that a network row is selected for the selection of additional network options. The view (705) asks for the user to provide the number of spine switches. The user may select one of the user interface elements displayed in the view (705) to identify the spine switch count, which is reflected in the window (702) and saved in the project data for the project.

Figure 8:
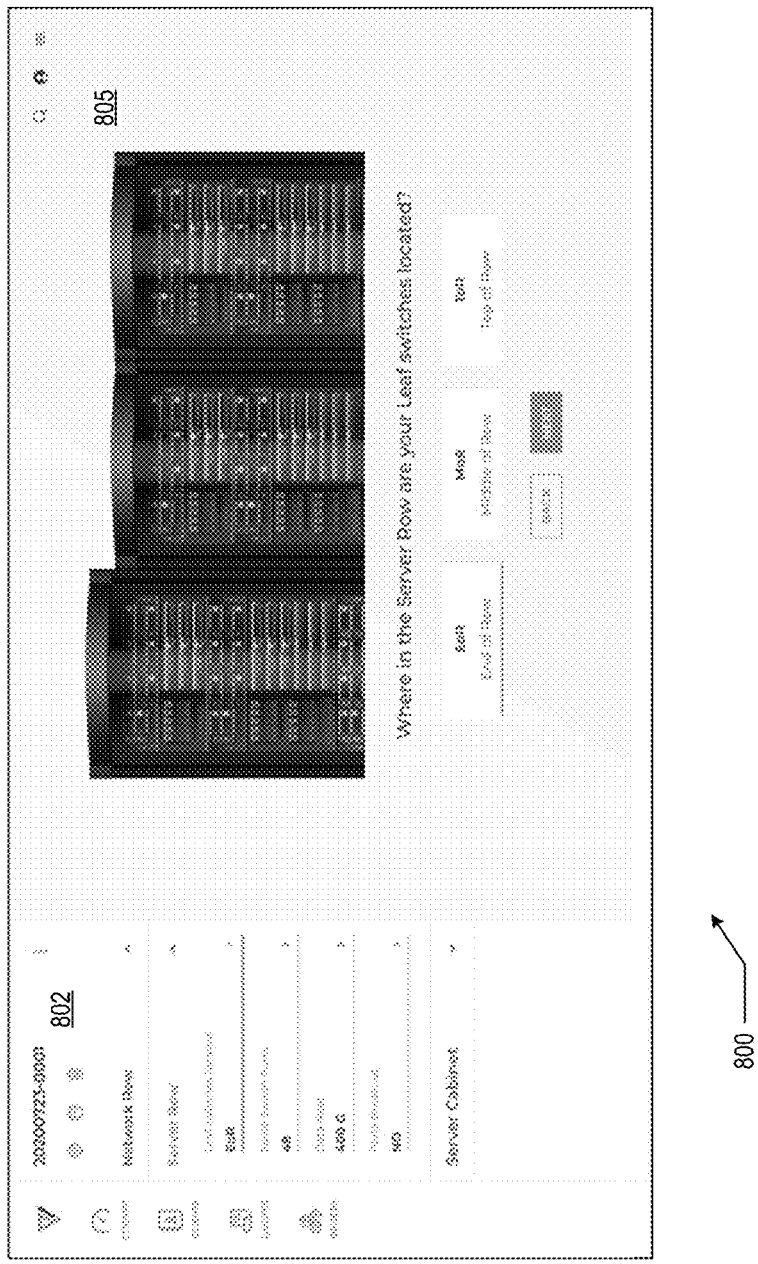

Turning to FIG. 8, the user interface (800) is displayed. The user interface (800) includes the window (802) and the view (805). The window (802) shows that a server row is selected for the selection of additional network options. The view (805) asks for the user to identify a location of the leaf switches in a server row. The user may select one of the user interface elements displayed in the view (805) to identify the location of the leaf switches in the server row, which is reflected in the window (802) and saved in the project data for the project.

Figure 9:
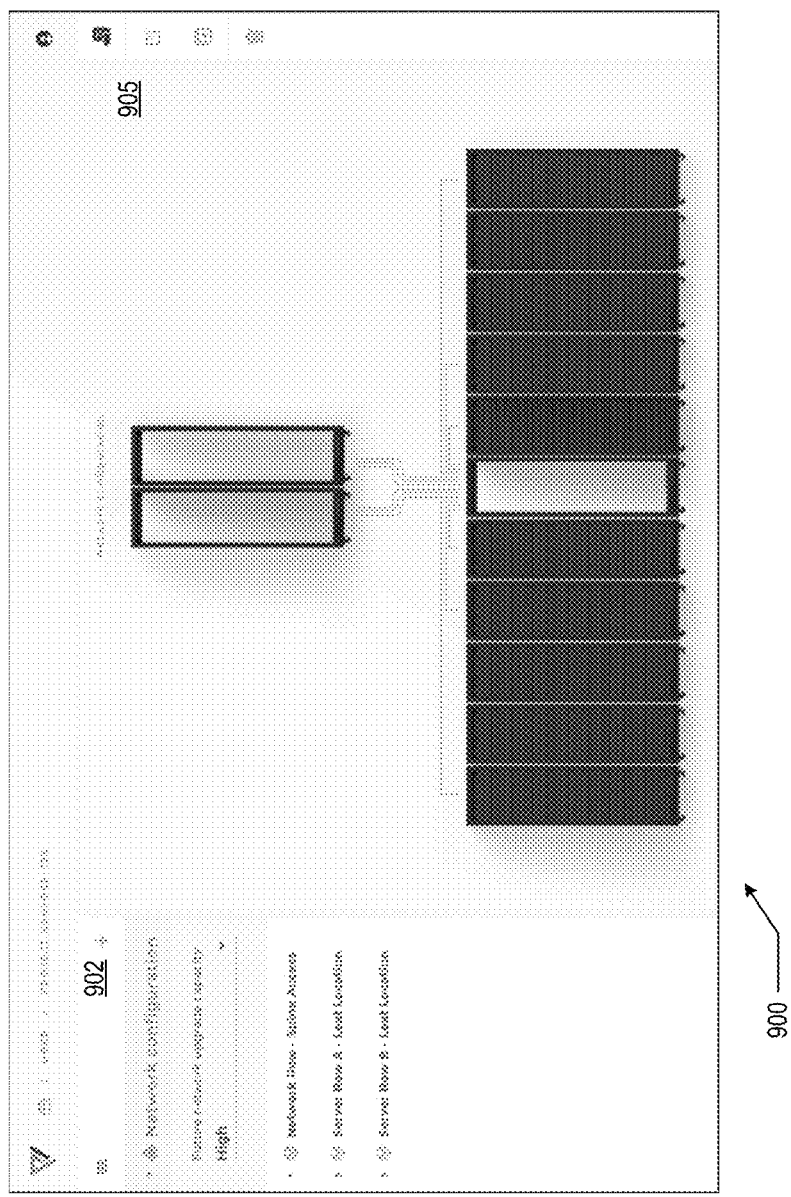

Turning to FIG. 9, the user interface (900) is displayed. The user interface (900) includes the window (902) and the view (905). The window (902) shows that a network configuration is selected for the selection of additional network options. The view (905) illustrates the future upgrade capacity of the network being designed as shown by three empty server racks.

Figure 10:
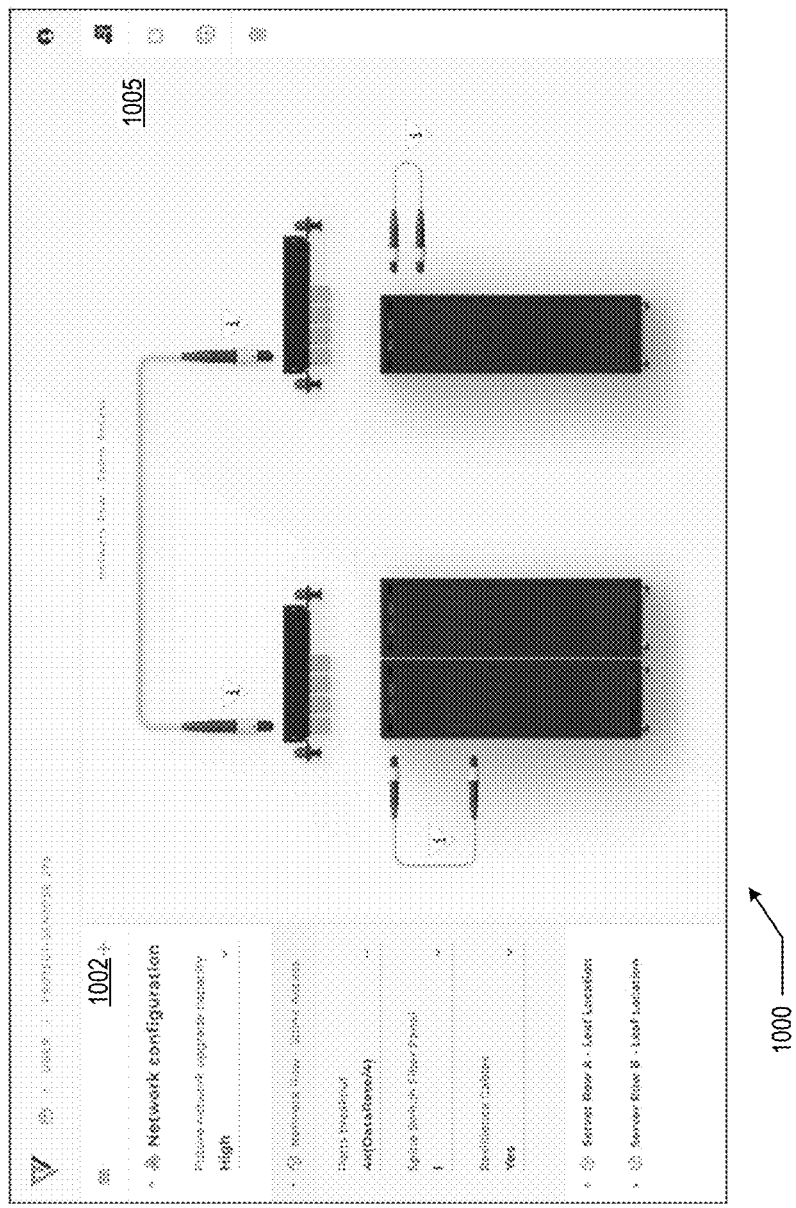

Turning to FIG. 10, the user interface (1000) is displayed. The user interface (1000) includes the window (1002) and the view (1005). The window (1002) shows that a network row is selected for the selection of additional network options. The view (1005) displays components for the network row. The components are displayed in accordance with the network selections of the network selection options shown in the window (1002).

Figure 11:

Turning to FIG. 11, the user interface (1100) is displayed. The user interface (1100) includes the window (1102) and the view (1105). The window (1102) shows additional network selection options for a spine/leaf architecture. The view (1105) shows a leaf switch and asks the user to select the model of the leaf switch used for the network. The selection is updated in the window (1102) and is saved to the project data for the network.

Figure 12:
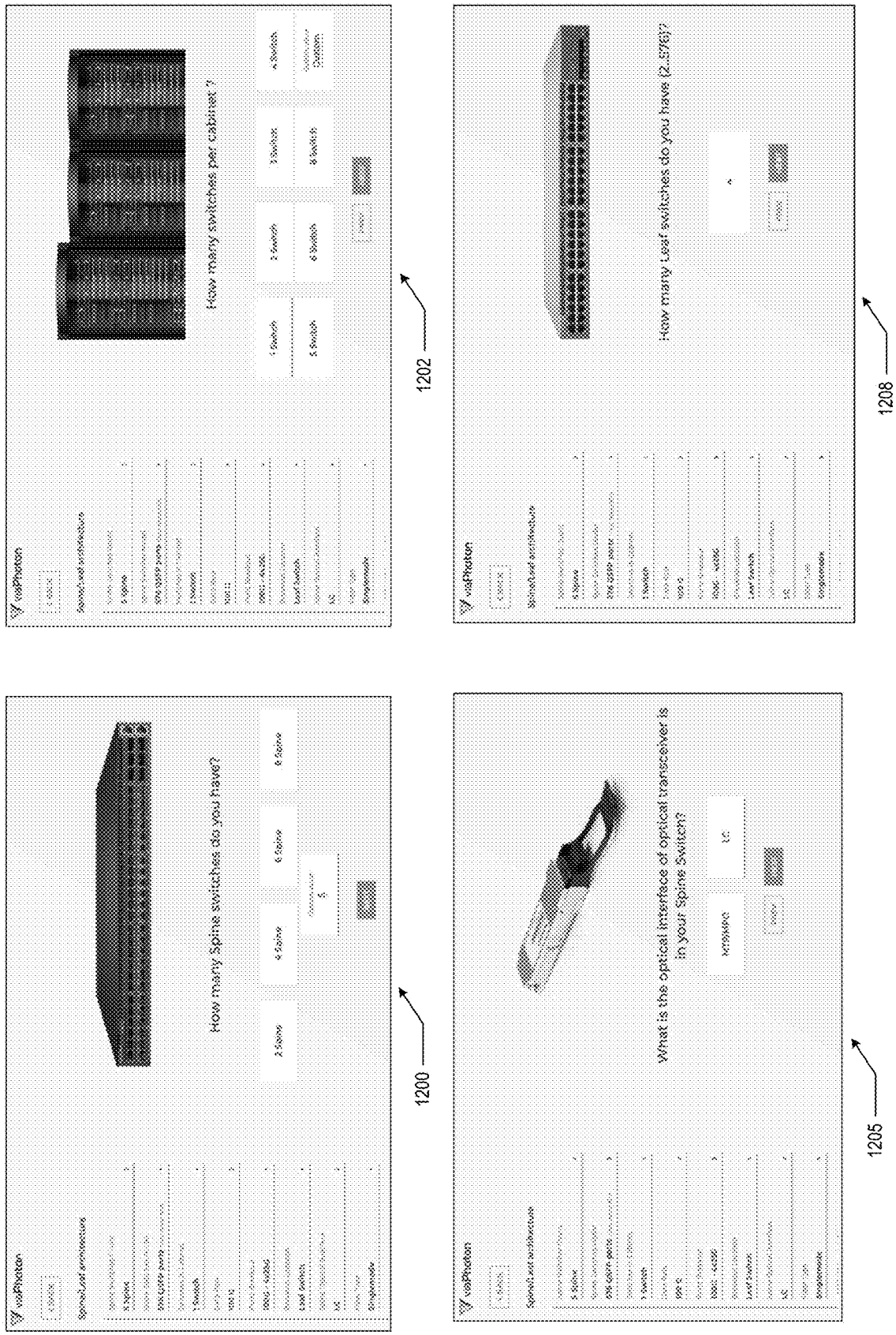

Turning to FIG. 12, the user interfaces (1200), (1202), (1205), and (1208) ask additional questions for a network using a spine/leaf architecture. The selections for the questions from the user interfaces (1200), (1202), (1205), and (1208) are persisted to the project data for the project created by the user. The user interface asks for the number of spine switches. The user interface (1202) asks for the number of switches per cabinet. The user interface (1205) asks for the optical interface of the optical transceiver of the spine switches. The user interface (1208) asks for the number of leaf switches. The selections from the user interfaces (1200), (1202), (1205), and (1208) are used to generate a component listing that is compatible with the network designed by the user. For example, the number of cables is identified to match the number of cables needed to connect the spine switches to the leaf switches and use compatible interfaces for the connections (e.g., using LC connectors).

Figure 13A:
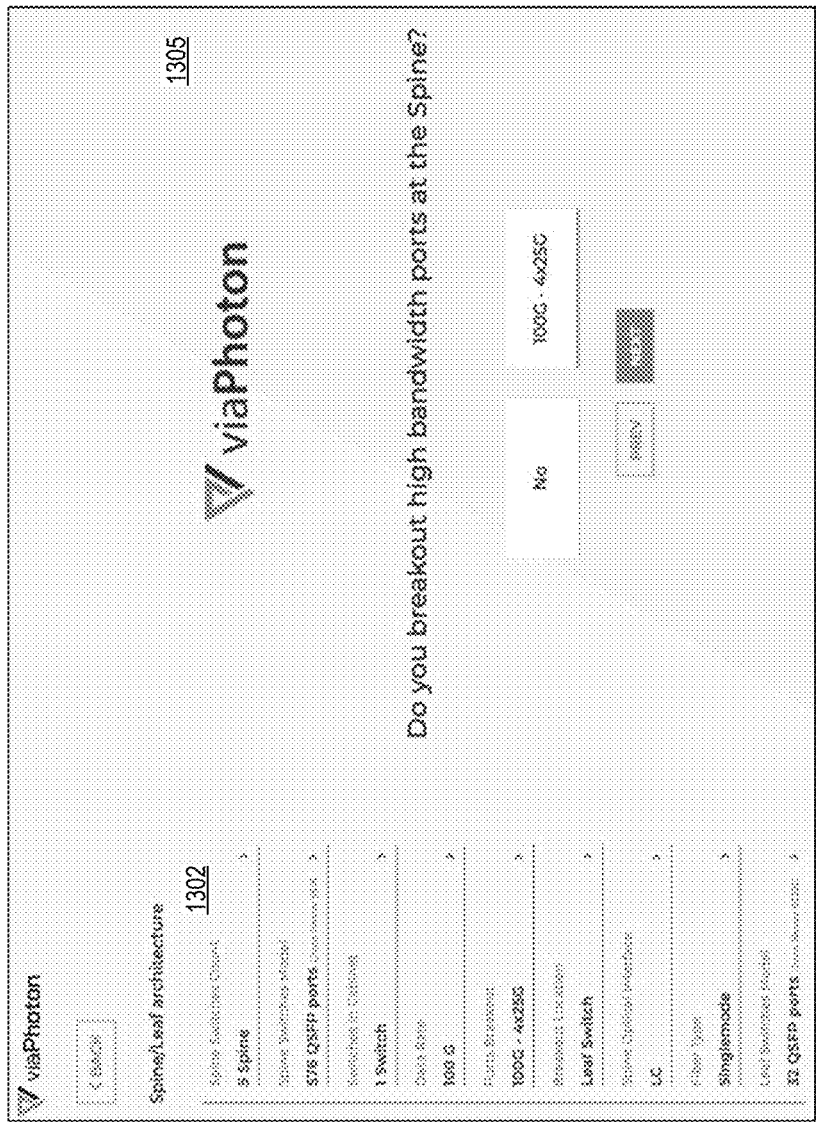

Turning to FIG. 13A, the user interface (1300) is displayed. The user interface (1300) includes the window (1302) and the view (1305). The window (1302) shows additional network selection options for a spine/leaf architecture. The view (1305) shows a leaf switch and asks the user identify if high bandwidth ports are broken out at the spine. The selection is updated in the window (1302) and is saved to the project data for the network.

Figure 13B:
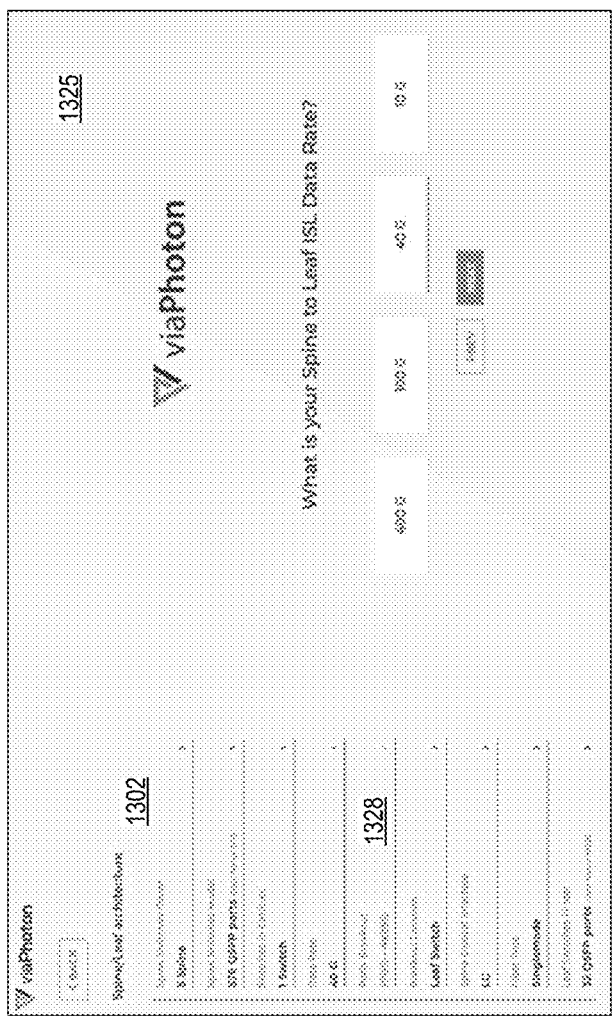

Turning to FIG. 13B, the user interface (1300) is updated with the view (1325) for a subsequent question. The question asks to identify the spine to leaf ISL (inter-switch link) data rate. The selection ("40 G") is received by the system. Network logic is applied to the selection and the system identifies that the selection ("40 G") is incompatible with another selection ("100G-4×25G" for "ports breakout"). The prior (and now) incompatible selection (1328) is highlighted by updating the font to include strikethrough text and may be updated to change the font color to red. The user may resolve the incompatibility by clicking on the option ("ports breakout") with the incompatible selection ("100G-4×25G") and identifying a different selection that is compatible with the present selection ("40 G") for the present option ("data rate").

Figure 14:
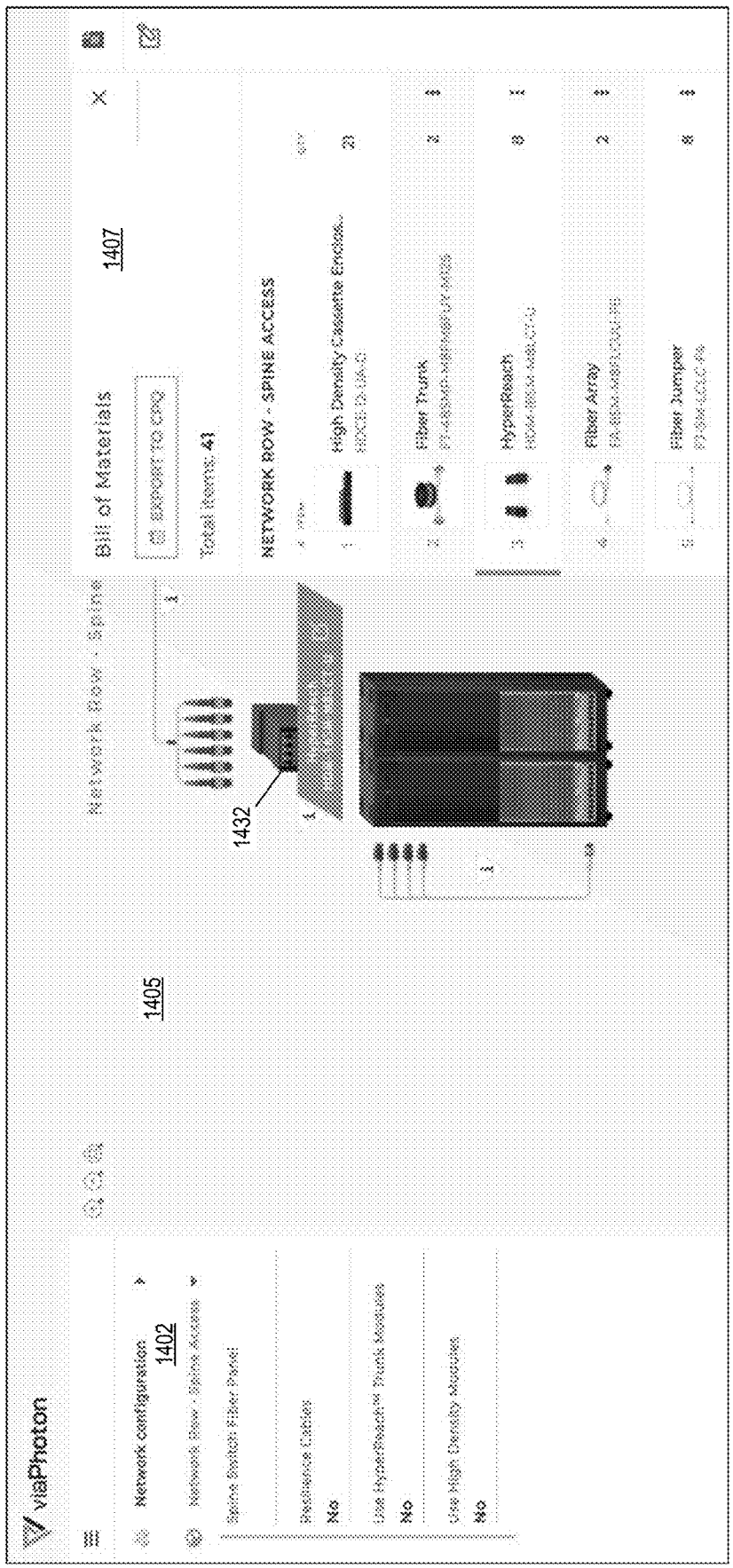

Turning to FIG. 14, the user interface (1400) is displayed. The user interface (1400) includes the window (1402), the view (1405), and the window (1407) (also referred to as a panel or right panel). The window (1402) shows that a network row is selected and shown in the view (1405). The window (1407) displays a component listing with the components that are automatically generated for the network constructed by the user.

In the view (1405), the user interface element (1432) that corresponds to a module is selected. The component listing, of the window (1407), is updated to highlight the module at line 3 that corresponds to the module of the selected with the user interface element (1432). The component listing may be exported to a component manager by selecting the button labeled "export to cpq".

Figure 15A:
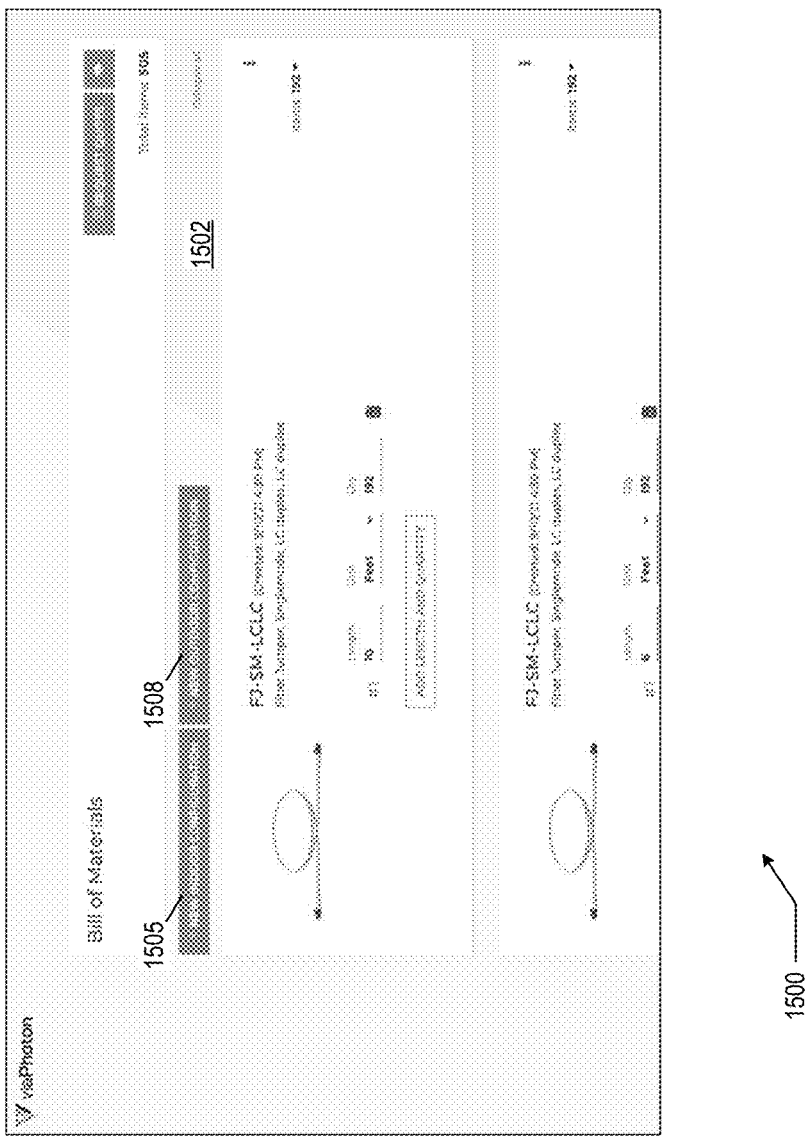

Turning to FIG. 15A, the user interface (1500) displays the component listing (1502) that is part of a bill of materials. Additional items to the component listing may be added with the buttons (1505) and (1508). The button (1505) is used to add components for an indoor configuration and the button (1508) is used to add components for an outdoor configuration. The items in the component listing (1502) may be selected and configured.

Figure 15B:
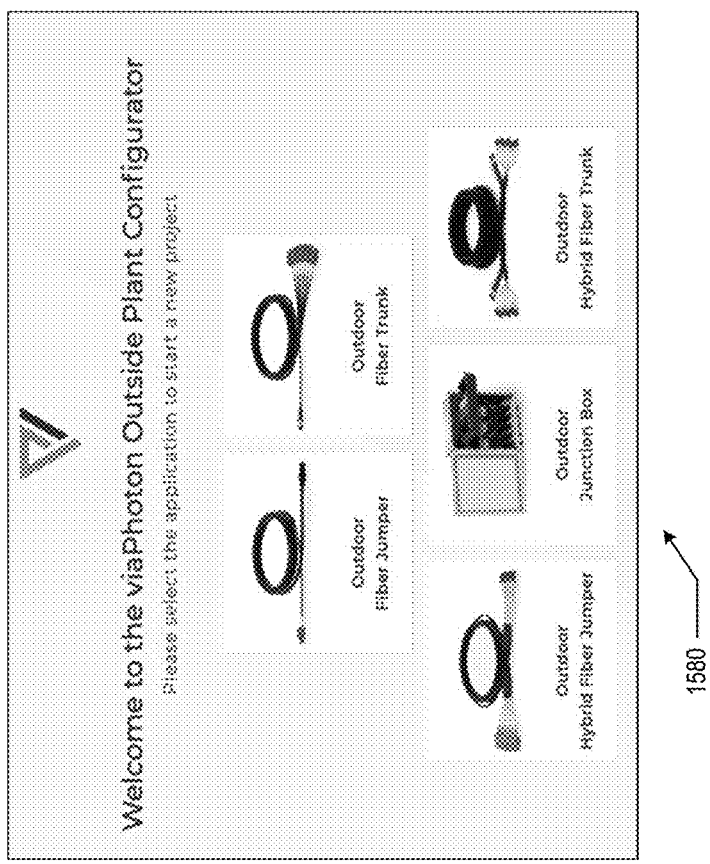
Figure 15B:
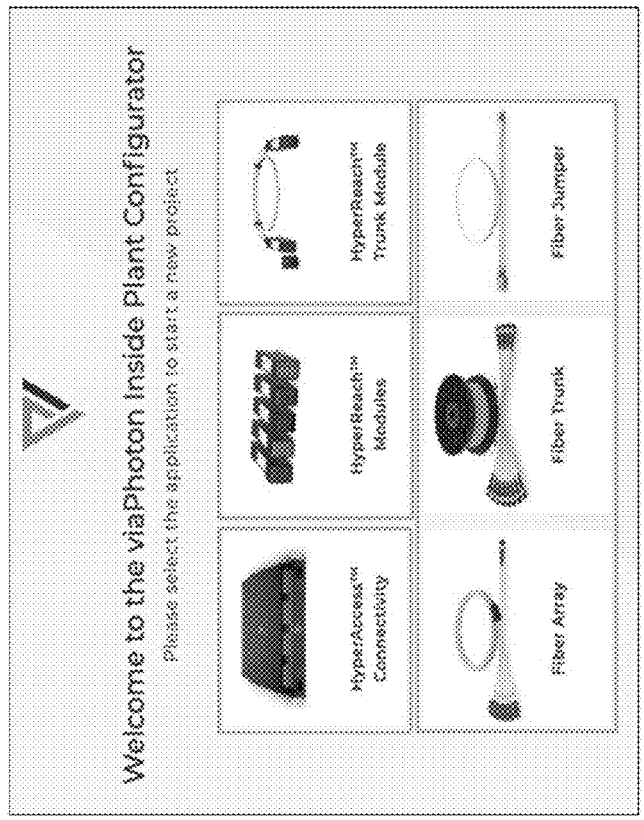

Turning to FIG. 15B, the user interface (1550) is displayed responsive to the selection of the button (1505) (of FIG. 15A) and the user interface (1580) is displayed responsive to the selection of the button (1508) (of FIG. 15A). The user interface (1550) displays user interface elements for selecting a type of indoor component to further configure and add to the component listing (1502). The user interface (1580) displays user interface elements for selecting a type of outdoor component to further configure and add to the component listing (1502).

Figure 16:
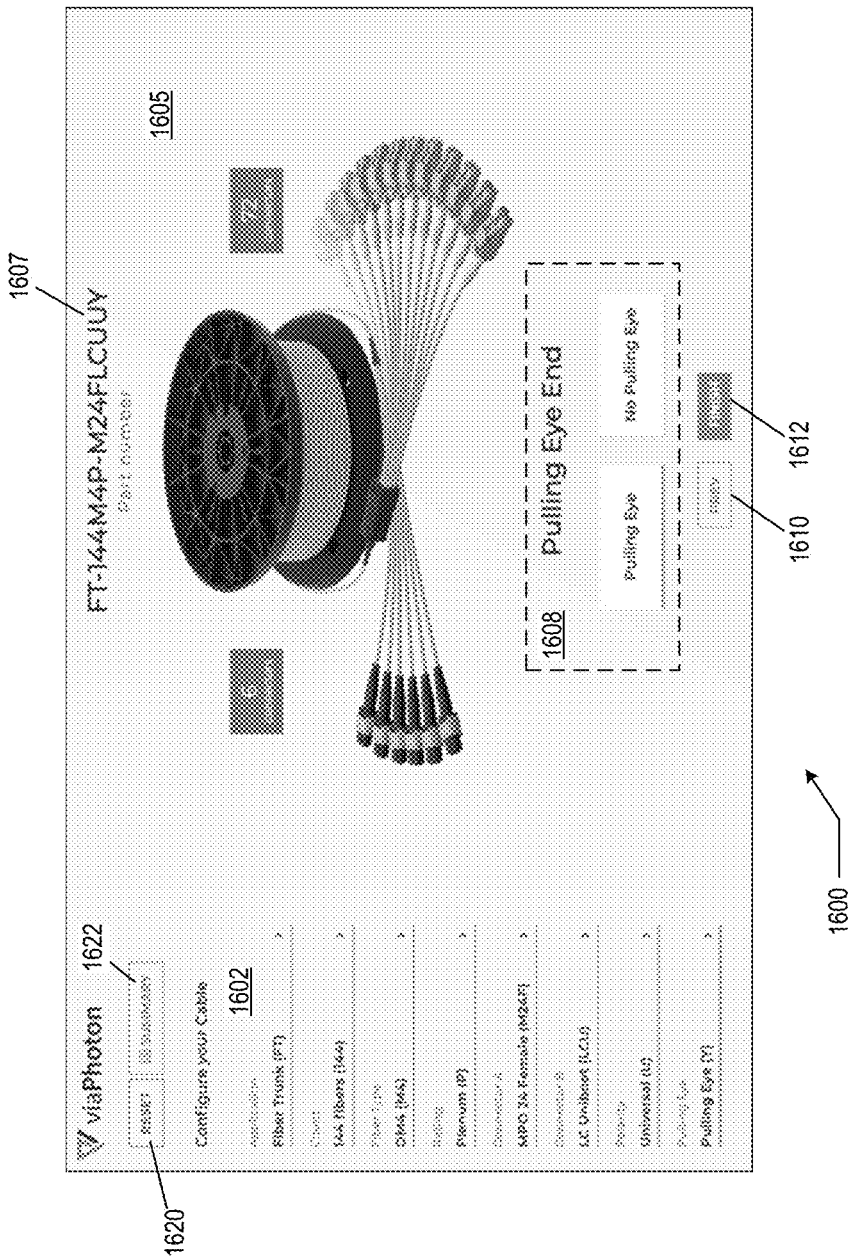

Turning to FIG. 16, the user interface (1600) is displayed. The user interface (1600) shows a highly realistic render of a component selected from a component listing. The render of the component displayed in the view (1605) is continuously updated with the selection made to the options listed in the window (1602). As an example, if the connectors shown at the ends of the cable in the render are updated to a different type of connector, the render is updated to show the different type of connector. The new render may be retrieved from a repository or generated on demand. The render may be generated on demand by compositing renders of the individual parts of the component. For example, renders for the cable, the first end connectors and the second end connectors may be composited on demand to generate the render displayed in the user interface (1600).

The part number (1607) may also be continuously updated. As the selections are received for the options to configure the component, the part number is updated to display the part number that matches the selections.

Additionally, the question area (1608) is also updated to reflect the selections. When an answer is received with question area (1608), the corresponding selection is updated in the window (1602) and the question area (1608) may be updated to show a question for the next option from the window (1602). When the user clicks on an item in the window (1602), the question area (1608) is updated to show the question corresponding to the item selected from the window (1602).

The buttons (1610) and (1612) may be used to move between the selection options available in the window (1602). The button (1610) selects the previous option, which updates the question area (1608). The button (1612) may display "next" or "finish" and selects either the next option from the window (1602) or finishes the configuration of the component when the last item in the window (1602) has been selected. Finishing the configuration saves the selections to the project data and returns the user to the user interface displaying the component listing.

Selection of the "reset" button (1620) resets the selections of the options to configure the component to the default settings. Selection of the "summary" button (1622) closes the user interface (1600) for configuring the component and displays a configuration summary.

Figure 17:

Turning to FIG. 17, a component that is a panel is configured with the user interface (1700). The window (1702) is used in conjunction with the view (1705) to configure the component.

Figure 18:
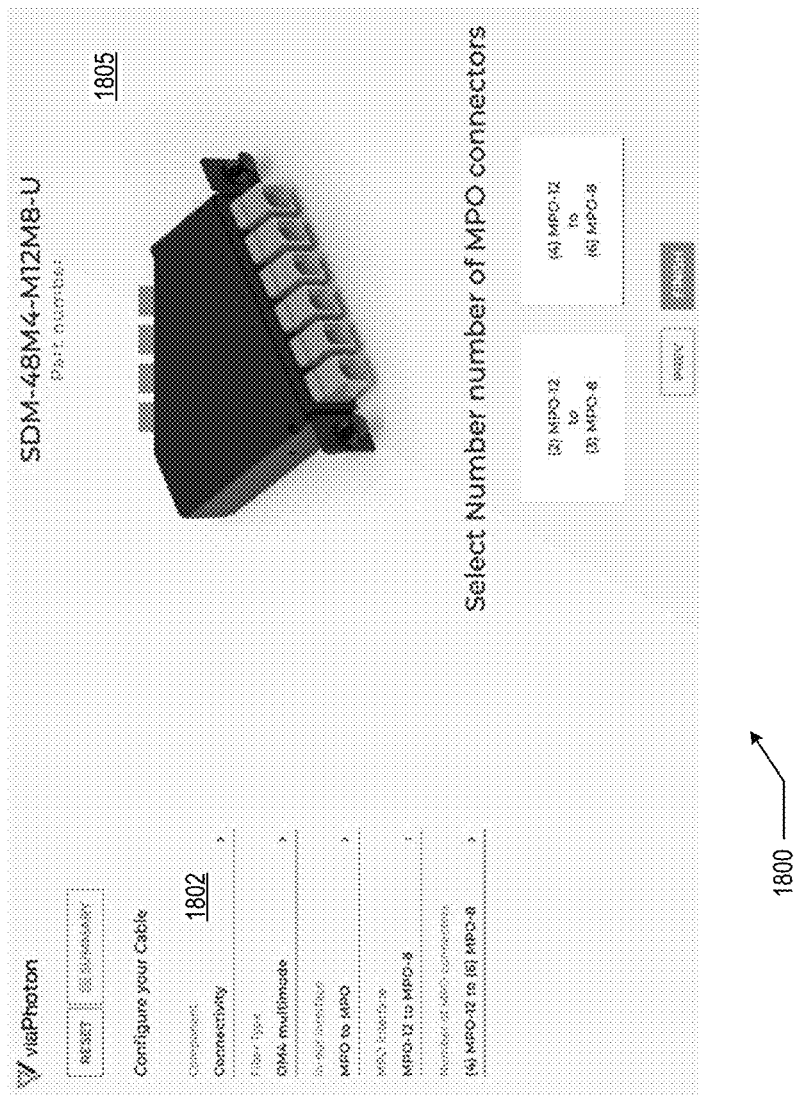

Turning to FIG. 18, a component corresponding an adapter panel connecting different types of connectors (4 MPO-12 fibers to 6 MPO-8 fibers) is configured with the user interface (1800). The window (1802) is used in conjunction with the view (1805) to configure the component.

Figure 19:

Turning to FIG. 19, a component corresponding the modules and connectors for a panel is configured with the user interface (1900). The window (1902) is used in conjunction with the view (1905) to configure the component.

Figure 20:
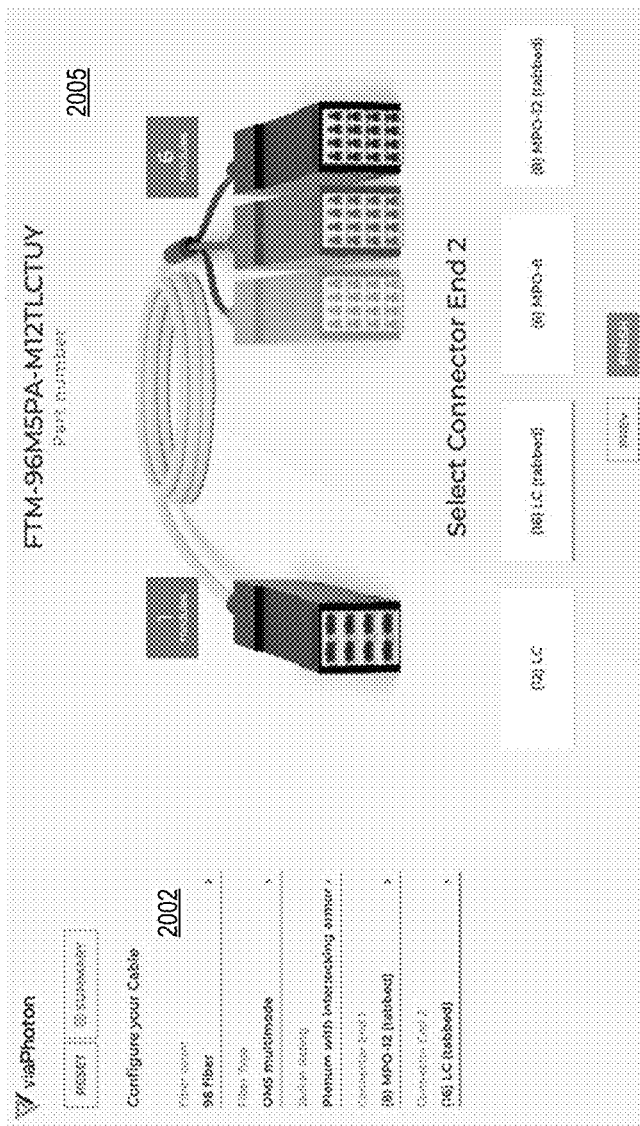

Turning to FIG. 20, a component corresponding the fiber trunk module with different connector types is configured with the user interface (2000). The fiber type, modules and connectors may be different. The window (2002) is used in conjunction with the view (2005) to configure the component.

Figure 21:

Turning to FIG. 21, a component corresponding fiber type, shroud options, jacket rating, and connectors for an outdoor fiber jumper is configured with the user interface (2100). The window (2102) is used in conjunction with the view (2105) to configure the component.

The render of the component is updated to identify selections from the options from the window (2102). For example, the render is modified to indicate the breakout lengths for the ends of the cable being configured.

Figure 22:
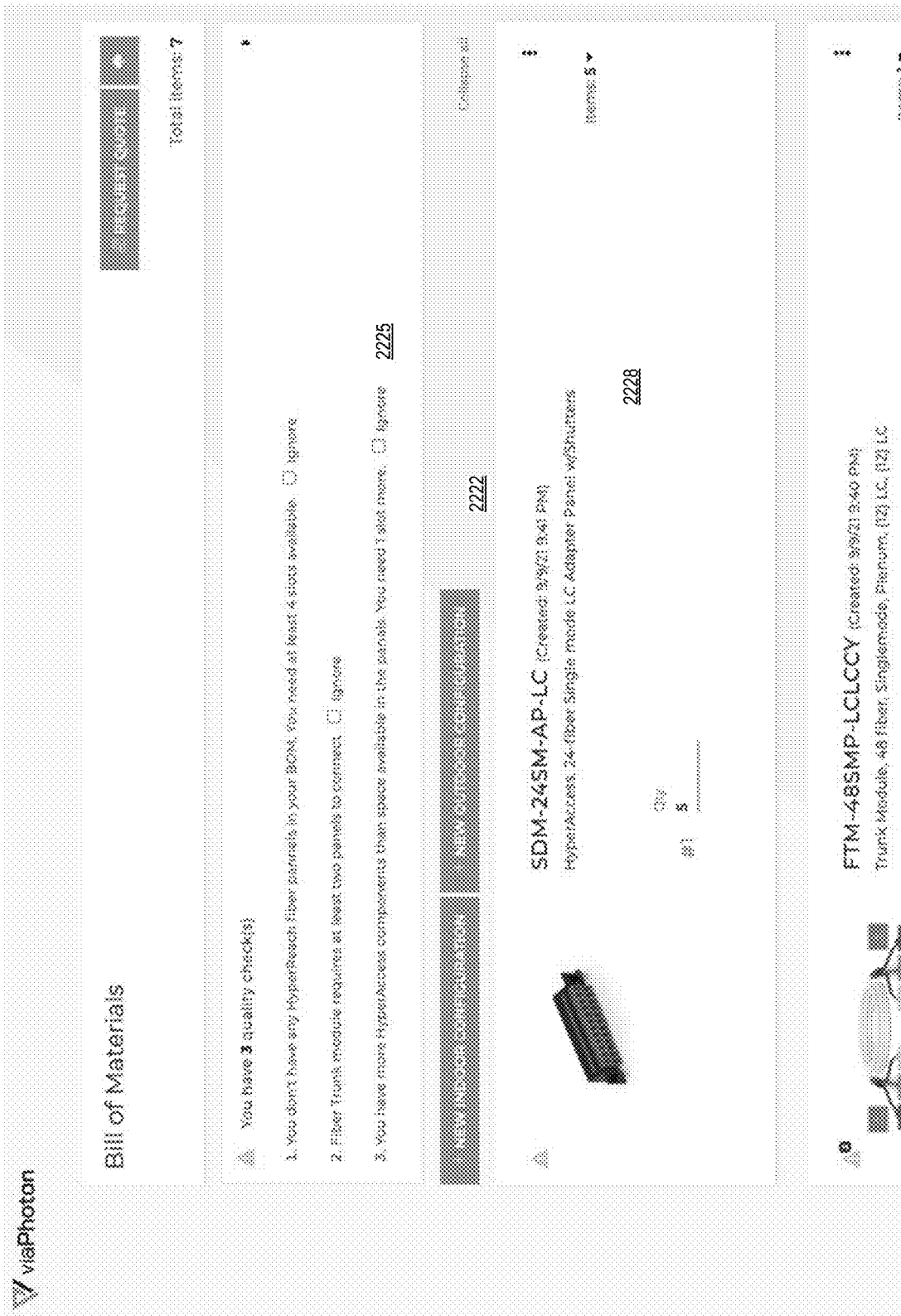

Turning to FIG. 22, the user interface (2200) shows the component listing (2222) of a bill of materials that includes the component (2228). In one embodiment, the single image for a component of an item in the component listing (2222) is prerendered by the server after receiving each of the component configuration selections for the component. Additionally, the logic and rules have been applied and warning are identified for the components in the window (2225). Each item for which a warning was generated includes an icon that may indicate the warning and number of warnings for the item.

Figure 23:
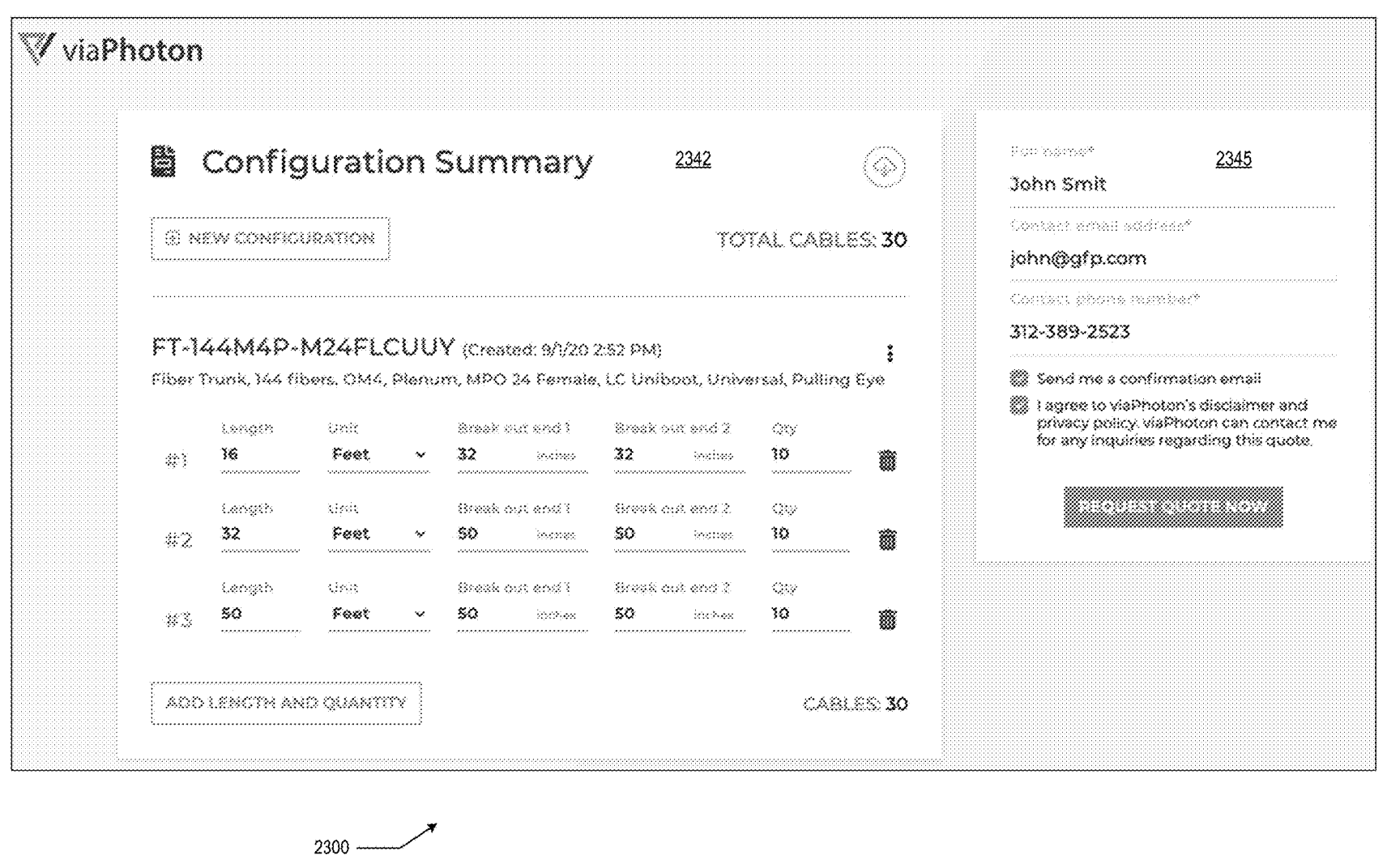

Turning to FIG. 23, the configuration summary (2342) is shown in the user interface (2300). The configuration summary (2342) identifies the component of a component listing from which a request for quote may be generated. The window (2345) include information about the user of the system.

Turning to FIG. 24, the user interface (2400) shows a preview of an order in the window (2455). The preview of the order identifies the components from the component listing and may include descriptions of the parts of the components.

Figure 25:
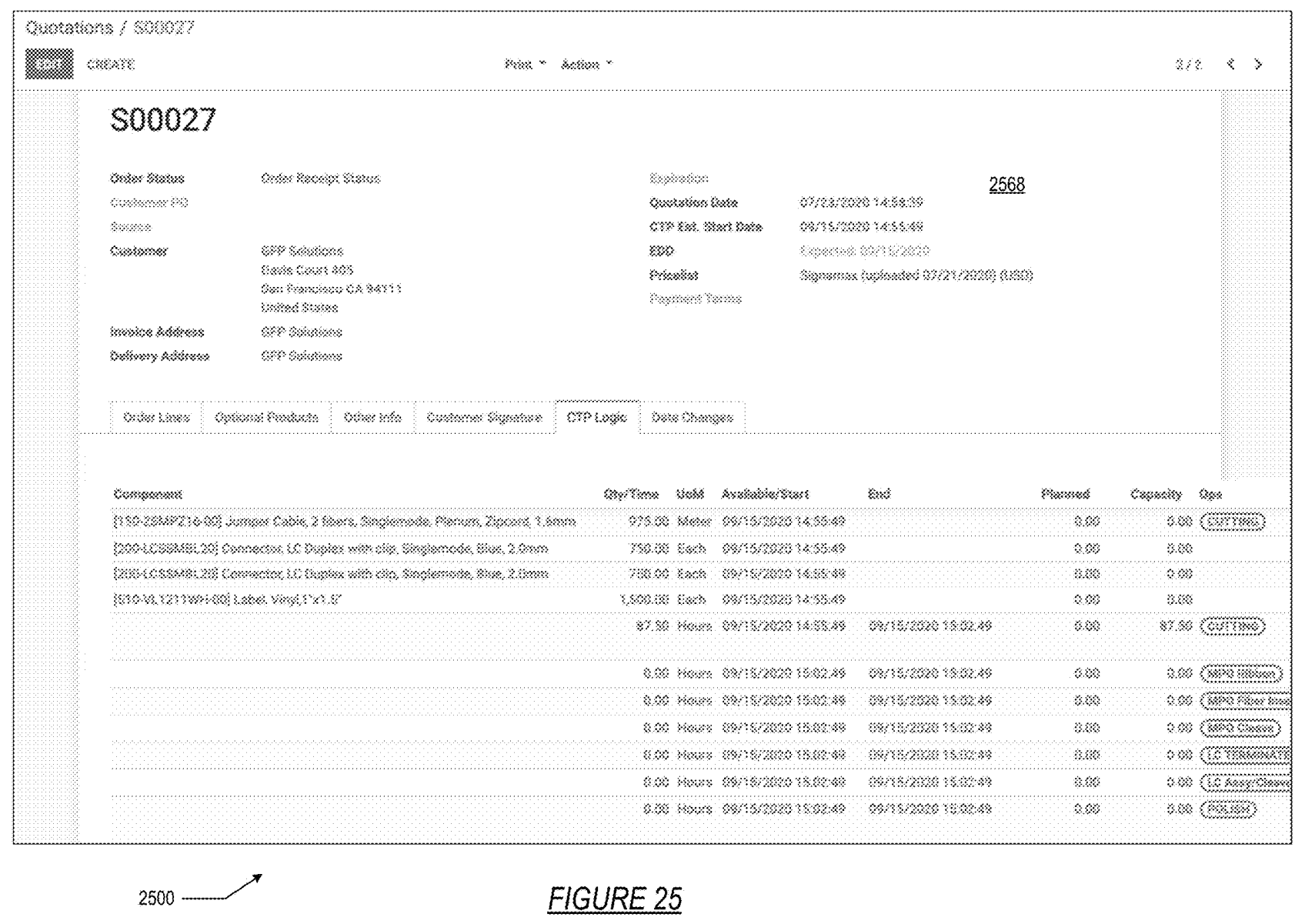

Turning to FIG. 25, the user interface (2500) shows results of a simulation in the window (2568). Descriptions of the assembly operations are included, which include the steps of "cutting", "MPO ribbon", "MPO fiber insert", "MPO cleave", "LC terminate", "LC assembly/cleave", and "polish" with a schedule for the operations. Different assembly operations may be used for different components.

Figure 26:

Turning to FIG. 26, the user interface (2600) shows a quote in the window (2678). The quote includes a schedule with an estimated delivery date generated by a simulation from a planning system based on the components form a component listing generated with the system.

Embodiments of the invention may be implemented on a computing system. Any combination of a mobile, a desktop, a server, a router, a switch, an embedded device, or other types of hardware may be used. For example, as shown in FIG. 27A, the computing system (2700) may include one or more computer processor(s) (2702), non-persistent storage (2704) (e.g., volatile memory, such as a random access memory (RAM), cache memory), persistent storage (2706) (e.g., a hard disk, an optical drive such as a compact disk (CD) drive or a digital versatile disk (DVD) drive, a flash memory, etc.), a communication interface (2712) (e.g., Bluetooth interface, infrared interface, network interface, optical interface, etc.), and numerous other elements and functionalities.

The computer processor(s) (2702) may be an integrated circuit for processing instructions. For example, the computer processor(s) (2702) may be one or more cores or micro-cores of a processor. The computing system (2700) may also include one or more input device(s) (2710), such as a touchscreen, a keyboard, a mouse, a microphone, a touchpad, an electronic pen, or any other type of input device.

The communication interface (2712) may include an integrated circuit for connecting the computing system (2700) to a network (not shown) (e.g., a local area network (LAN), a wide area network (WAN) such as the Internet, a mobile network, or any other type of network) and/or to another device, such as another computing device.

Further, the computing system (2700) may include one or more output device(s) (2708), such as a screen (e.g., a liquid crystal display (LCD), a plasma display, a touchscreen, a cathode ray tube (CRT) monitor, a projector, or other display device), a printer, an external storage, or any other output device. One or more of the output device(s) (2708) may be the same or different from the input device(s) (2710). The input and output device(s) (2710 and 2708) may be locally or remotely connected to the computer processor(s) (2702), non-persistent storage (2704), and persistent storage (2706). Many different types of computing systems exist, and the aforementioned input and output device(s) (2710 and 2708) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (2700) in FIG. 27A may be connected to or be a part of a network. For example, as shown in FIG. 27B, the network (2720) may include multiple nodes (e.g., node X (2722), node Y (2724)). Each node may correspond to a computing system, such as the computing system (2700) shown in FIG. 27A, or a group of nodes combined may correspond to the computing system (2700) shown in FIG. 27A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (2700) may be located at a remote location and connected to the other elements over a network.

Figure 27B:
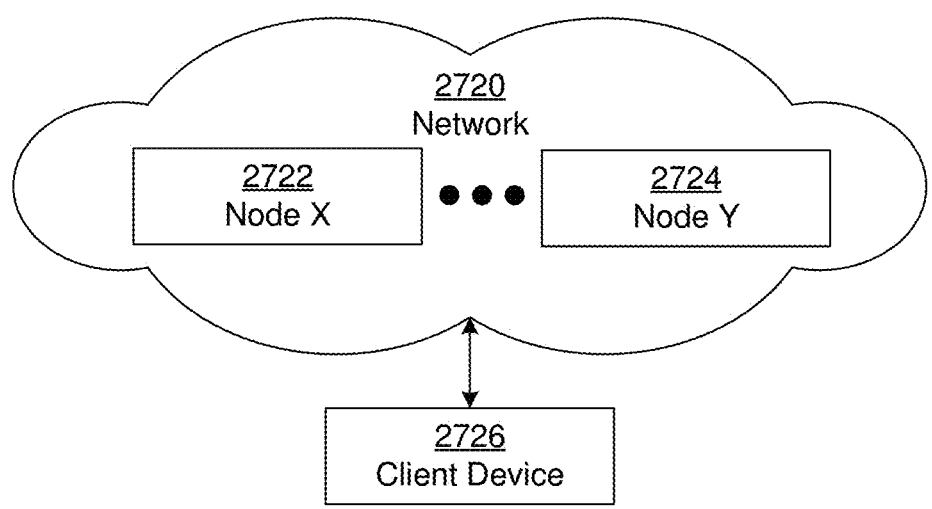

Although not shown in FIG. 27B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (2722), node Y (2724)) in the network (2720) may be configured to provide services for a client device (2726). For example, the nodes may be part of a cloud computing system. The nodes may include functionality to receive requests from the client device (2726) and transmit responses to the client device (2726). The client device (2726) may be a computing system, such as the computing system (2700) shown in FIG. 27A. Further, the client device (2726) may include and/or perform all or a portion of one or more embodiments of the invention.

The computing system (2700) or group of computing systems described in FIGS. 27A and 27B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (2700) in FIG. 27A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (2700) of FIG. 27A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (2700) in FIG. 27A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (2700) of FIG. 27A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (2700) of FIG. 27A and the nodes (e.g., node X (2722), node Y (2724)) and/or client device (2726) in FIG. 27B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
configuring a network interactively by receiving a network selection, updating network selection options using the network selection, and presenting network view updated using the network selection;
generating a component listing for at least a part of the network using the network selection;
configuring a component from the component listing interactively by receiving a component selection, updating component selection options using the component selection, and presenting a component view updated using the component selection;
presenting a schedule, for the component listing, generated by simulating assembly of components, including the component, of the component listing using a planning system.

2. The method of claim 1, further comprising:
presenting the network selection options in a first window of a user interface; and
receiving the network selection from the first window.

3. The method of claim 1, further comprising:
presenting the component listing in a second window of a user interface; and
presenting the component selection options in a third window in response to an item selection from the second window.

4. The method of claim 1, further comprising:
presenting the component selection options in a third window of a user interface; and
receiving the component selection from the third window.

5. The method of claim 1, further comprising:
presenting the network view by retrieving a set of images and constructing a network image from the set of images, wherein the set of images are prerendered and the network image illustrates the network selection.

6. The method of claim 1, further comprising:
presenting the component view by retrieving a set of images and constructing a component image from the set of images, wherein the set of images are prerendered and realistic, and wherein the component image is realistic and illustrates the component selection.

7. The method of claim 1, further comprising:
updating the network selection options using network option logic to prevent erroneous selections.

8. The method of claim 1, further comprising:
updating the component selection options using component option logic to prevent erroneous selections.

9. The method of claim 1, further comprising:
generating the schedule by transmitting the component listing to the planning system and receiving the schedule from the planning system.

10. The method of claim 1, further comprising:
generating the schedule a part of a report for the component listing.

11. A system comprising:
a network configuration controller;
a component configuration controller;
a schedule controller; and
an application, executing on at least one processor of the system, configured for:
configuring, with the network configuration controller, a network interactively by receiving a network selection, updating network selection options using the network selection, and presenting network view updated using the network selection;

generating a component listing for at least a part of the network and using the network selection;

configuring, with the component configuration controller, a component from the component listing interactively by receiving a component selection, updating component selection options using the component selection, and presenting a component view updated using the component selection;

presenting a schedule, for the component listing, generated by the schedule controller by simulating assembly of components, including the component, of the component listing using a planning system.

12. The system of claim 11, wherein the application is further configured for:

presenting the network selection options in a first window of a user interface; and receiving the network selection from the first window.

13. The system of claim 11, wherein the application is further configured for:

presenting the component listing in a second window of a user interface; and presenting the component selection options in a third window in response to an item selection from the second window.

14. The system of claim 11, wherein the application is further configured for:

presenting the component selection options in a third window of a user interface; and receiving the component selection from the third window.

15. The system of claim 11, wherein the application is further configured for:

presenting the network view by retrieving a set of images and constructing a network image from the set of images, wherein the set of images are prerendered and the network image illustrates the network selection.

16. The system of claim 11, wherein the application is further configured for:

presenting the component view by retrieving a set of images and constructing a component image from the set of images, wherein the set of images are prerendered and realistic, and wherein the component image is realistic and illustrates the component selection.

17. The system of claim 11, wherein the application is further configured for:

updating the network selection options using network option logic to prevent erroneous selections.

18. The system of claim 11, wherein the application is further configured for:

updating the component selection options using component option logic to prevent erroneous selections.

19. The system of claim 11, wherein the application is further configured for:

generating the schedule by transmitting the component listing to the planning system and receiving the schedule from the planning system.

20. A set of one or more non-transitory computer readable mediums comprising computer readable program code that executes on a computing system and is configured for:

configuring a network interactively by receiving a network selection, updating network selection options using the network selection, and presenting network view updated using the network selection;

generating a component listing for at least a part of the network and using the network selection;

configuring a component from the component listing interactively by receiving a component selection, updating component selection options using the component selection, and presenting a component view updated using the component selection;

presenting a schedule, for the component listing, generated by simulating assembly of components, including the component, of the component listing using a planning system.

* * * * *